US012412537B2

(12) United States Patent
Hagiwara et al.

(10) Patent No.: US 12,412,537 B2
(45) Date of Patent: Sep. 9, 2025

(54) DISPLAY APPARATUS AND DISPLAY CONTROL METHOD

(71) Applicant: SHARP KABUSHIKI KAISHA, Sakai (JP)

(72) Inventors: Naoaki Hagiwara, Sakai (JP); Yuichi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 14 days.

(21) Appl. No.: 18/508,890

(22) Filed: Nov. 14, 2023

(65) Prior Publication Data

US 2024/0169934 A1 May 23, 2024

(30) Foreign Application Priority Data

Nov. 17, 2022 (JP) ................................ 2022-183765

(51) Int. Cl.
*G09G 3/34* (2006.01)

(52) U.S. Cl.
CPC ... *G09G 3/3406* (2013.01); *G09G 2320/0626* (2013.01); *G09G 2360/144* (2013.01)

(58) Field of Classification Search
CPC .......... G09G 3/3406; G09G 3/20; G09G 3/36; G09G 3/34; G09G 3/3413; G09G 2320/0626; G09G 2360/144
See application file for complete search history.

(56) References Cited

U.S. PATENT DOCUMENTS

2005/0190142 A1* 9/2005 Ferguson ............. G09G 3/3406 345/204
2010/0264850 A1* 10/2010 Yamamoto ........... G09G 3/3208 315/312
2015/0009249 A1* 1/2015 Kudo ........................ G06T 5/94 345/691
2018/0182306 A1* 6/2018 Seong ....................... G09G 3/36
2020/0105182 A1* 4/2020 Koo ..................... G09G 3/3625

FOREIGN PATENT DOCUMENTS

JP 2013-162513 A 8/2013

* cited by examiner

*Primary Examiner* — Mihir K Rayan
(74) *Attorney, Agent, or Firm* — ScienBiziP, P.C.

(57) ABSTRACT

A display apparatus includes: a display that displays an image; a receiver that receives input signals corresponding to an input image; a surrounding environmental data processor that determines a surrounding environmental light condition including information representing a brightness of surroundings of the display apparatus; a backlight illumination ratio determiner that determines, for each of a plurality of areas set on the display, an illumination ratio of a backlight of the display based on the input signals and the surrounding environmental light condition; and a display controller that causes the display to display the input image by illuminating the backlight of the display based on the illumination ratio, wherein the backlight illumination ratio determiner determines the illumination ratio so that areas corresponding to a high tone range are assigned an illumination ratio of greater than or equal to an illumination ratio threshold value, the high tone range including input signals having a signal value of greater than or equal to a first signal threshold value.

15 Claims, 12 Drawing Sheets

| | | | | | | | | |
|---|---|---|---|---|---|---|---|---|
| 255 | 255 | 0 | 0 | 0 | 0 | 0 | 0 | 0 |
| 255 | 255 | 0 | 0 | 0 | 0 | 0 | 0 | 0 |
| 0 | 0 | 0 | 128 | 128 | 128 | 0 | 0 | 0 |
| 0 | 0 | 0 | 128 | 128 | 128 | 0 | 0 | 0 |
| 0 | 0 | 0 | 128 | 128 | 128 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 16 | 16 | 16 | 16 | 16 | 16 | 16 | 16 | 16 |
| 0 | 0 | 0 | 0 | 0 | 0 | 0 | 0 | 0 |

DISPLAY APPARATUS AND DISPLAY CONTROL METHOD

BACKGROUND OF THE INVENTION

Field of the Invention

The present disclosure relates to a display apparatus, a display control method, and the like.

Description of the Background Art

Various methods for controlling display apparatuses are known. For example, a conventionally known method switches, depending on the brightness of the surroundings of an apparatus, control curves to use that each define the relationship between a brightness-related index and a stretching amount by which the luminance of a backlight in the apparatus is stretched.

This known method can only determine Max luminance (maximum luminance of the backlight) based on the brightness of the surroundings of the apparatus, because the method is intended to control the stretching amount. For example, according to this known method, the relative relationship between the illumination ratio of the backlight corresponding to a high-luminance portion of an input image and the illumination ratio of the backlight corresponding to a darker portion of the input image is invariable regardless of the brightness of the surroundings.

According to some aspects of the present disclosure, it is possible to provide a display apparatus, a display control method, and the like for flexibly controlling the illumination ratio of a backlight depending on signal values corresponding to an input image and a surrounding environmental light condition.

SUMMARY OF THE INVENTION

An aspect of the present disclosure relates to a display apparatus including: a display that displays an image; a receiver that receives input signals corresponding to an input image; a surrounding environmental data processor that determines a surrounding environmental light condition including information representing a brightness of surroundings of the display apparatus; a backlight illumination ratio determiner that determines, for each of a plurality of areas set on the display, an illumination ratio of a backlight of the display based on the input signals and the surrounding environmental light condition; and a display controller that causes the display to display the input image by illuminating the backlight of the display based on the illumination ratio, wherein the backlight illumination ratio determiner determines the illumination ratio so that areas corresponding to a high tone range are assigned an illumination ratio of greater than or equal to an illumination ratio threshold value, the high tone range including input signals having a signal value of greater than or equal to a first signal threshold value.

Another aspect of the present disclosure relates to a display control method including: receiving input signals corresponding to an input image; determining a surrounding environmental light condition including information representing a brightness of surroundings of a display apparatus; determining, for each of a plurality of areas set on a display of the display apparatus, an illumination ratio of a backlight of the display based on the input signals and the surrounding environmental light condition; and causing the display to display the input image by illuminating the backlight of the display based on the illumination ratio, wherein in the determining the illumination ratio of the backlight, the illumination ratio is determined so that areas corresponding to a high tone range are assigned an illumination ratio of greater than or equal to an illumination ratio threshold value, the high tone range including input signals having a signal value of greater than or equal to a first signal threshold value.

DESCRIPTION OF THE PREFERRED EMBODIMENTS

Figure 1:
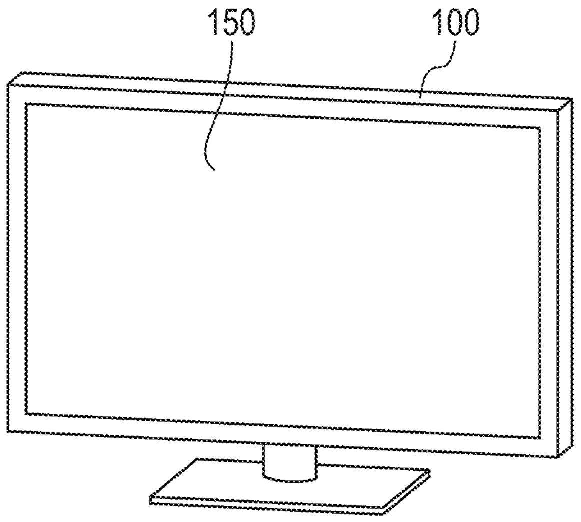
FIG. 1 is a diagram showing an external appearance example of a display apparatus.

The following describes an embodiment of the present disclosure with reference to the accompanying drawings. In the drawings, the same or equivalent elements are labeled with the same reference numerals, and description thereof is not repeated. It should be noted that the embodiment described below does not unreasonably limit what is defined in the appended claims. In addition, not all of elements of configuration described in the present embodiment are requirements of the present disclosure.

1. System Configuration Example

FIG. 1 is a diagram showing a configuration example of a television receiver, which is an example of a display apparatus 100 according to the present embodiment. The television receiver receives, for example, broadcast waves for television broadcast and displays video based on the received broadcast waves on a display panel (display 150). It should be noted that FIG. 1 shows an example of an external configuration of the display apparatus 100, and various modifications can be made to the specific shape of the display apparatus 100.

Figure 2:
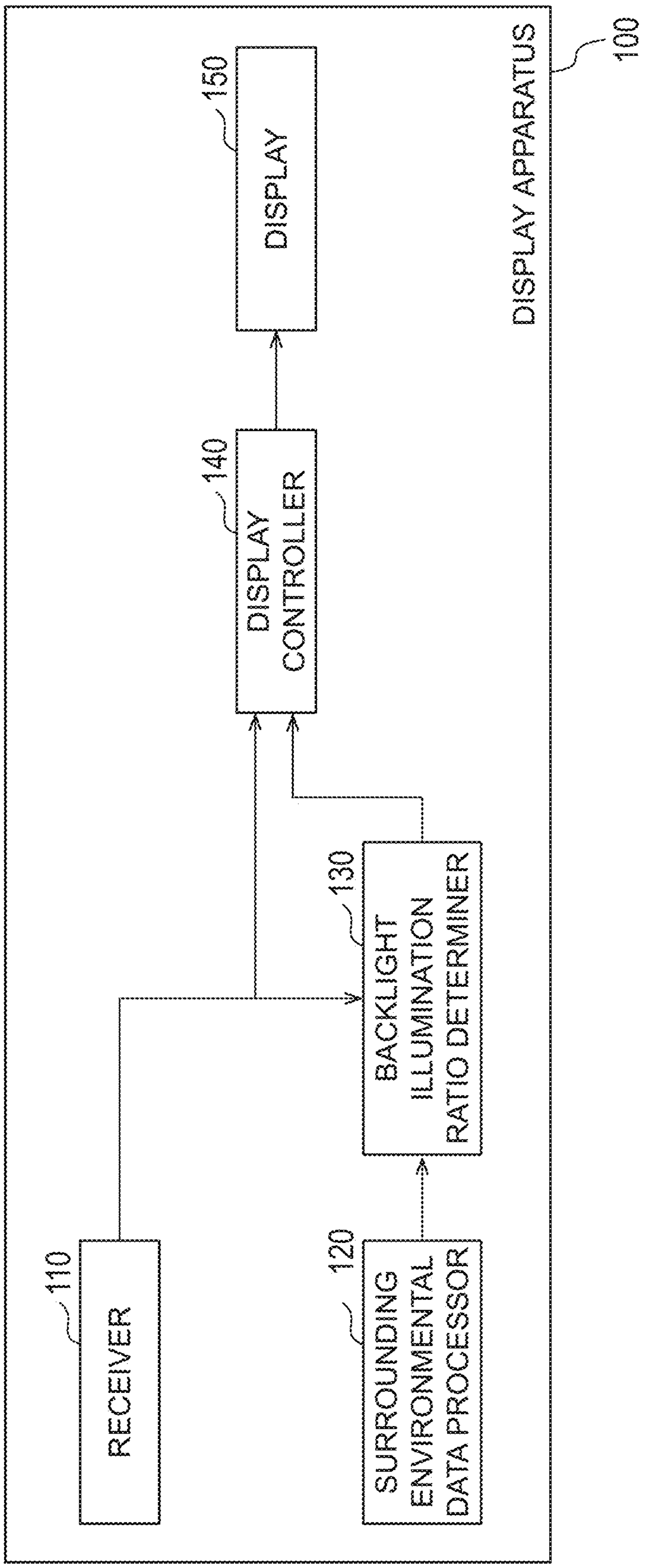
FIG. 2 is a diagram illustrating a configuration example of the display apparatus.

FIG. 2 is a diagram illustrating a configuration example of the display apparatus 100. The display apparatus 100 includes a receiver 110, a surrounding environmental data processor 120, a backlight illumination ratio determiner 130, a display controller 140, and the display 150. However, the configuration of the display apparatus 100 is not limited to that illustrated in FIG. 2, and modifications such as omission of some elements of configuration and addition of other elements of configuration are possible.

The receiver 110 receives input signals corresponding to an input image. The input image herein represents an image to be displayed on the display 150. The receiver 110 may be, for example, a tuner that receives signals corresponding to broadcast waves for television broadcast from an antenna and outputs input signals based on the received signals. The tuner includes, for example, an interface for receiving broadcast waves for television broadcast at a specific frequency and circuitry that performs processing on the received broadcast waves. In this case, the input signals may be those in accordance with Rec.709 (BT.709), which is a standard related to coding and the like in high-definition television broadcast. Rec.709 specifies, for example, RGB color space parameters.

Alternatively, the receiver 110 may be implemented by a communication interface other than the tuner. For example, the communication interface is an interface for acquiring video signals from a Blu-ray Disc (BD, registered trademark) player or recorder, and may be a port to which a high-definition multimedia interface (HDMI) cable can be connected. In this case, the input signals may be signals corresponding to data stored on an optical storage medium such as a BD, or signals corresponding to data stored on a storage medium such as a hard disk drive (HDD) or a solid state drive (SSD). The communication interface may be an interface defined by an established standard such as IEEE 802.3 or IEEE 802.11. In this case, the input signals may be those obtained by the communication interface from a content server via a public communication network such as the Internet.

The surrounding environmental data processor 120 determines a surrounding environmental light condition including information representing the brightness of the surroundings of the display apparatus 100. For example, the surrounding environmental data processor 120 may determine the surrounding environmental light condition based on a sensor value from a brightness sensor. The brightness sensor herein is an illuminance meter, which may be implemented by, for example, a photoelectric conversion element such as a photodiode. However, the brightness sensor in the present embodiment may be any sensor that detects the brightness of the surroundings of the display apparatus 100, and may be implemented by an element other than a photodiode. The brightness sensor is provided, for example, on a front side of the display apparatus 100 (side where the display 150 can be viewed). However, the brightness sensor may be provided at another location on the display apparatus 100. Alternatively, the brightness sensor may be provided externally to the display apparatus 100, and the surrounding environmental data processor 120 may acquire sensor values by communicating with the brightness sensor. The surrounding environmental data processor 120 may also determine the surrounding environmental light condition based on information from an image sensor (camera) that can determine saturation and hue in addition to brightness (lightness). The image sensor herein may be provided in the display apparatus 100, or may be an external camera provided externally to the display apparatus 100. For example, the display apparatus 100 may acquire information from the external camera via a network (in a narrow sense, a home LAN). Sensors provided externally to the display apparatus 100 may include a motion sensor. That is, various modifications can be made to the specific form of the present embodiment.

The surrounding environmental data processor 120 determines, for example, a parameter representing the brightness by performing a process for comparing the sensor value with predetermined threshold values, and a process for outputting the parameter as the surrounding environmental light condition to the backlight illumination ratio determiner 130. The surrounding environmental light condition is not limited to such brightness information, but may also include other information related to the surrounding environmental light, such as color temperature. The details of the processes will be described below using some drawings including FIG. 5.

Based on the input signals and the surrounding environmental light condition, the backlight illumination ratio determiner 130 performs a process for determining the illumination ratio of a backlight of the display 150 for each of a plurality of areas set on the display 150. For example, the display apparatus 100 according to the present embodiment is capable of performing so-called local dimming, in which the backlight of the display 150 is divided into a plurality of areas and the brightness of the backlight is controlled on an area-by-area basis. The backlight illumination ratio determiner 130 determines the illumination ratio of the backlight for each area in the local dimming based on the surrounding environmental light condition. The details of processes to be performed by the backlight illumination ratio determiner 130 will be described below.

The display controller 140 performs control to cause the display 150 to display an input image by illuminating the backlight of the display 150 based on the illumination ratio determined by the backlight illumination ratio determiner 130.

The surrounding environmental data processor 120, the backlight illumination ratio determiner 130, and the display controller 140 of the present embodiment may be implemented by a processor. As this processor, various processors are usable, such as a central processing unit (CPU), a graphics processing unit (GPU), or a digital signal processor (DSP). The processor may include hardware such as an application specific integrated circuit (ASIC) or a field programmable gate array (FPGA).

The display 150 displays images. The display 150 is, for example, a liquid-crystal display. However, the display 150 of the present embodiment may be any other type of display having a backlight.

The display apparatus 100 may also include memory and an operation interface not shown in FIG. 2. The memory is a work area of the processor and stores various information therein. The memory may be semiconductor memory such as static random access memory (SRAM) or dynamic random access memory (DRAM), or a register, a magnetic storage device such as an HDD, or an optical storage device such as an optical disk device. The operation interface is an interface to be used by a user when operating the display apparatus 100. The operation interface may be buttons provided on a housing of the display apparatus 100 or an interface to be used for communication with a remote controller (for example, an infrared receiver).

Figure 3:
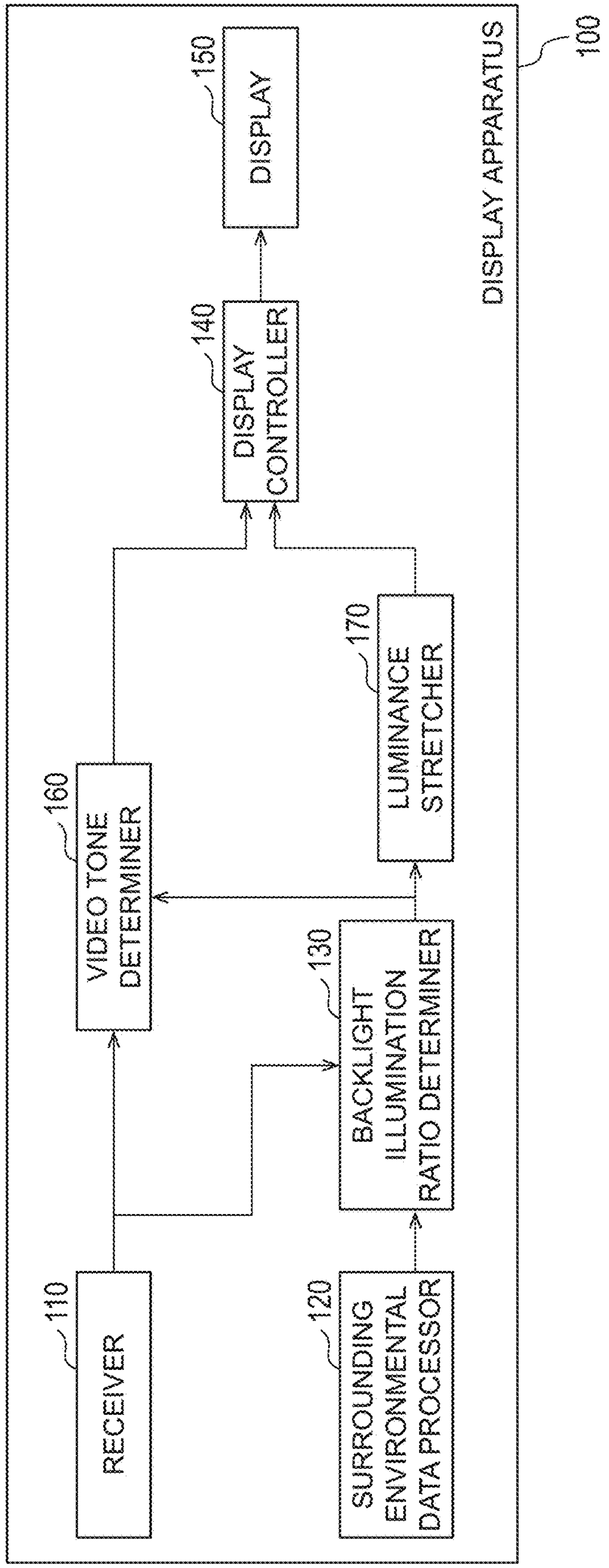
FIG. 3 is a diagram illustrating a configuration example of the display apparatus.

FIG. 3 is a diagram illustrating another configuration example of the display apparatus 100. In addition to the configuration shown in FIG. 2, the display apparatus 100 may include a video tone determiner 160 and a luminance stretcher 170. The receiver 110, the surrounding environmental data processor 120, the backlight illumination ratio determiner 130, the display controller 140, and the display 150 are the same as those shown in FIG. 2, and thus description thereof is omitted.

The video tone determiner 160 performs a process for correcting the signal values (tone values) of the input signals based on the illumination ratio determined by the backlight illumination ratio determiner 130. For example, the video tone determiner 160 may determine the corrected signal values based on Equation (1) shown below.

Corrected signal value=(signal value of input signal)/(illumination ratio of backlight) (1)

The signal values of the input signals herein refer to, for example, the luminance values of respective pixels of the input image. In a case where the signal values are 8-bit data, the signal values are between 0 and 255. The illumination ratio of the backlight refers to a numerical value that represents the degree of illumination of the backlight. For example, the illumination ratio of the backlight is a numerical value of greater than or equal to 0 and less than or equal to 1 (greater than or equal to 0% and less than or equal to 100%) that represents a ratio of an actual luminous intensity to the maximum luminous intensity (for example, a numerical value expressed in units of $cd/m^2$) that the backlight can output. In the present embodiment, the local dimming is performed in which the illumination ratio is determined for each of the plurality of areas. Accordingly, the signal value of each pixel is corrected based on the illumination ratio of the area to which the pixel belongs.

In the example using Equation (1) above, the signal value is not changed if the illumination ratio of the backlight is maximum (illumination ratio=100%), and is corrected in such a manner that the signal value increases with a decrease in the illumination ratio. However, because of light leakage that can occur in a configuration in which a liquid-crystal panel is used as the display 150, increasing the illumination ratio of the backlight makes a screen appear brighter. Conversely, decreasing the illumination ratio of the backlight increases the signal value of the input signal and contributes to opening a liquid-crystal shutter, allowing more light leakage from the backlight, but contributes to dimming the backlight, making the screen appear darker. Consequently, even after the correction has been made by the video tone determiner 160, areas with a higher illumination ratio of the backlight are displayed brighter and areas with a low illumination ratio of the backlight are displayed darker.

The luminance stretcher 170 performs a correction process on the illumination ratio determined by the backlight illumination ratio determiner 130. For example, the luminance stretcher 170 of the present embodiment can perform the same control as in the aforementioned known method, in which the Max luminance is controlled based on the brightness of the surroundings.

As shown in FIG. 3, the video tone determiner 160 corrects the signal values of the input signals based on the output from the backlight illumination ratio determiner 130, which in other words is the illumination ratio of the backlight prior to the correction process by the luminance stretcher 170. The display controller 140 may then cause the display 150 to display the input image based on the input signals having a signal value corrected by the video tone determiner 160 and the illumination ratio subjected to the correction process by the luminance stretcher 170. This configuration makes it possible to correct the signal values of the input signals and stretch the luminance of the backlight. As can be appreciated from the description above, the display controller 140 "illuminating the backlight of the display 150 based on the illumination ratio determined by the backlight illumination ratio determiner 130" in the method of the present embodiment is not limited to the display controller 140 illuminating the backlight of the display 150 using the illumination ratio determined by the backlight illumination ratio determiner 130 as is, and may also encompass the display controller 140 illuminating the backlight of the display 150 using an illumination ratio resulting from the luminance stretching performed on the illumination ratio determined by the backlight illumination ratio determiner 130.

2. Details of Processing

Figure 4:
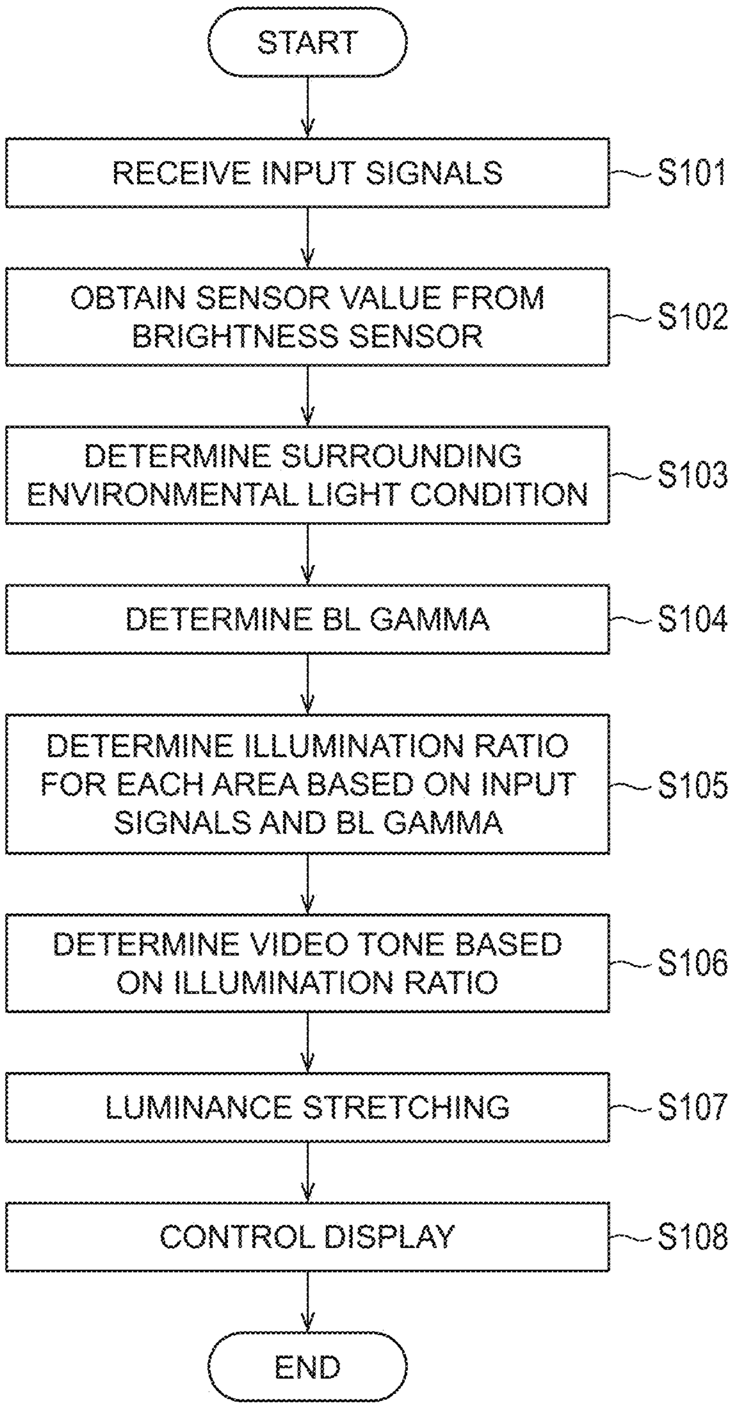
FIG. 4 is a flowchart for explaining processing in the display apparatus.

FIG. 4 is a flowchart for explaining processing in the display apparatus 100 according to the present embodiment. Once the processing starts, the receiver 110 first receives input signals in Step S101.

In Step S102, the surrounding environmental data processor 120 obtains a sensor value from the brightness sensor. For example, the brightness sensor detects light around the display apparatus 100 and outputs the detection result as a sensor value to the surrounding environmental data processor 120.

Figure 5:
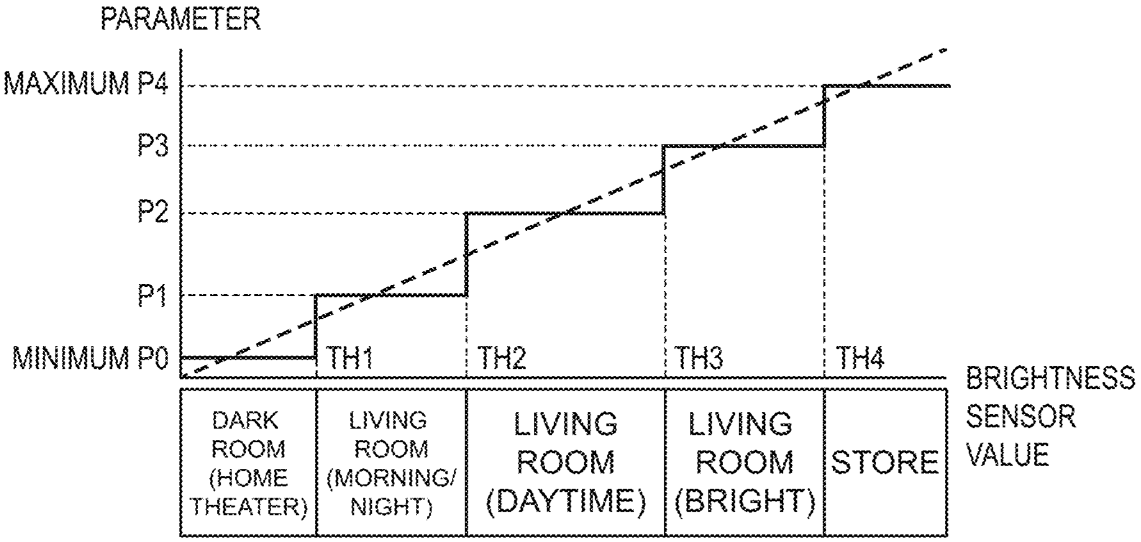
FIG. 5 is a diagram showing the relationship between the sensor value from a brightness sensor and a surrounding environmental light condition, and use cases.

In Step S103, the surrounding environmental data processor 120 determines the surrounding environmental light condition based on the sensor value. FIG. 5 is a diagram for explaining a process for determining the surrounding environmental light condition based on the sensor value. The horizontal axis in FIG. 5 represents sensor value, and moving to the right indicates increasing sensor values (increasing surrounding brightness). The vertical axis in FIG. 5 represents parameter to be determined based on the sensor value. The surrounding environmental light condition may be, for example, this parameter.

For example, threshold values may be prestored in the memory of the display apparatus 100. The threshold values herein are for use in comparison with the sensor value from the brightness sensor. In the example shown in FIG. 5, the threshold values are TH1, TH2, TH3, and TH4. In the present embodiment, for example, the following use cases may be assumed based on these threshold values. A sensor value of less than TH1 represents a condition in which the surroundings of the display apparatus 100 are equivalent to a dark room such as a home theater. A sensor value of greater than or equal to TH1 and less than TH2 represents a condition in which the surroundings of the display apparatus 100 are equivalent to a living room when the outside is relatively dark as in the morning or at night. A sensor value of greater than or equal to TH2 and less than TH3 represents a condition in which the surroundings of the display apparatus 100 are equivalent to a living room when the outside is bright as in the daytime. A sensor value of greater than or equal to TH3 and less than TH4 represents a condition in which the surroundings of the display apparatus 100 are equivalent to a particularly bright living room, such as when sunlight streams in or the brightness of lighting is at a high level. A sensor value of greater than or equal to TH4 represents a condition in which the surroundings of the display apparatus 100 are brighter than the inside of a typical home, such as when the display apparatus 100 is being sold in an electronics retail store or when the display apparatus 100 is displaying an advertisement in a commercial facility. However, the description given above is an example of threshold value setting, and the threshold values may be set from a different perspective.

The surrounding environmental data processor 120 determines the parameter that represents the surrounding environmental light condition based on the comparison between the sensor value and the threshold values. For example, the surrounding environmental data processor 120 determines the parameter to be P0 if the sensor value is less than TH1. The surrounding environmental data processor 120 determines the parameter to be P1 if the sensor value is greater than or equal to TH1 and less than TH2. Likewise, the surrounding environmental data processor 120 determines the parameter to be P2 if the sensor value is greater than or equal to TH2 and less than TH3, determines the parameter to be P3 if the sensor value is greater than or equal to TH3 and less than TH4, and determines the parameter to be P4 if the sensor value is greater than or equal to TH4. The example in which the parameter is set in discrete levels has been described so far. However, the parameter may be continuous values. For example, the surrounding environmental data processor 120 may determine the parameter based on the sensor value and a prestored continuous function that associates the sensor value and the parameter. For example, the sensor value and the parameter may have a linear relationship, as indicated by a dashed line in FIG. 5.

Next, the backlight illumination ratio determiner 130 determines the illumination ratio of the backlight for each of the plurality of areas based on the input signals and the surrounding environmental light condition. For example, the backlight illumination ratio determiner 130 may determine, based on the surrounding environmental light condition, association information indicating the association between the signal values of the input signals and the illumination ratio. The backlight illumination ratio determiner 130 then determines the illumination ratio of the backlight for each of the plurality of areas based on the determined association information and the input signals of the area. In this way, the illumination ratio can be appropriately determined based on the surrounding environmental light condition and the input signals. The following describes detailed processes.

First, in Step S104, the backlight illumination ratio determiner 130 determines a backlight gamma (also referred to below as a BL gamma) based on the surrounding environmental light condition. The BL gamma is a function that determines the relationship between an input illumination ratio and an output illumination ratio. Specifically, the BL gamma may be a gamma curve given by "output illumination ratio=(input illumination ratio) γ". The input illumination ratio is an illumination ratio of the backlight determined based on the signal values of the input signals for each area in the local dimming. That is, the BL gamma is information that associates the signal values of the input signals with the output illumination ratio, and is therefore included in the association information according to the present embodiment. However, the association information in the present embodiment is not limited to gamma curves, and may be other information that defines the association between the input signals and the illumination ratio.

In Step S105, for each of the plurality of areas, the backlight illumination ratio determiner 130 determines the input illumination ratio based on the signal values of the input signals, and determines the output illumination ratio based on the input illumination ratio and the BL gamma determined in Step S104. For example, the backlight illumination ratio determiner 130 may calculate a maximum value and an average value of the signal values (luminance values) of multiple pixels included in an area of interest and determine an area signal value based on Equation (2) shown below. In Equation (2), a is a variable of greater than or equal to 0 and less than or equal to 1.

$$\text{Area signal value}=\alpha\times\text{maximum value}+(1-\alpha)\times\text{average value} \quad (2)$$

For example, in a case where the signal value of each pixel is greater than or equal to 0 and less than or equal to 255, the area signal value is also greater than or equal to 0 and less than or equal to 255. The backlight illumination ratio determiner 130 determines the input illumination ratio based on the area signal value. For example, the area signal value and the input illumination ratio may have a linear relationship as represented by Equation (3) shown below. However, the specific relationship therebetween is not limited to Equation (3) as long as the input illumination ratio increases with an increase in the area signal value.

$$\text{Input illumination ratio}=(\text{area signal value}/255)\times 100\ (\%) \quad (3)$$

As mentioned above, the BL gamma is information that defines the relationship between the input illumination ratio and the output illumination ratio. Once the input illumination ratio is determined for each area, the output illumination ratio is determined for each area based on the input illumination ratio and the BL gamma. Since the BL gamma is determined depending on the surrounding environmental light condition in the present embodiment, the output illumination ratio is a value that takes into account the input signal and the surrounding environmental light condition.

Figure 6:
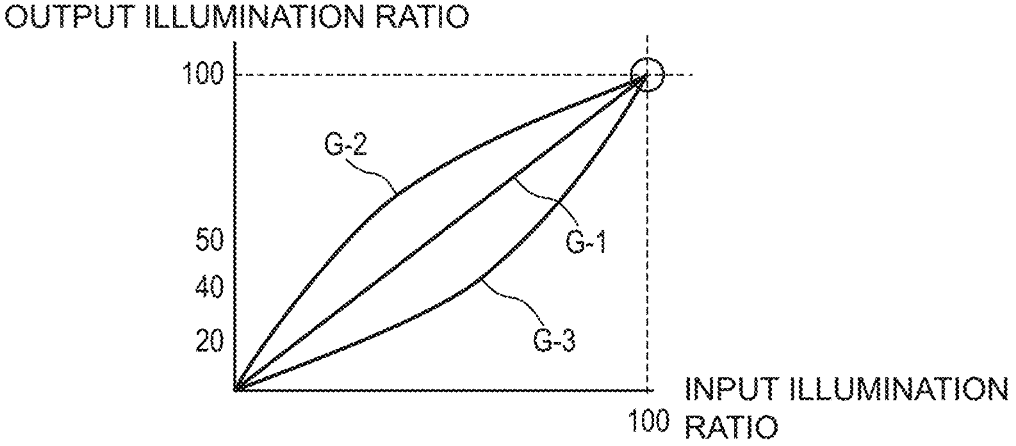
FIG. 6 is a diagram showing an example of relationships between input illumination ratio and output illumination ratio based on signal values of input signals.

The following describes the processes in Steps S104 and S105 in detail using a specific example. FIG. 6 shows an example of different BL gammas depending on the surrounding environmental light condition. For example, a plurality of BL gammas may be stored in the memory of the display apparatus 100. FIG. 6 shows, as an example, three BL gamma curves, G-1, G-2, and G-3. However, in a case where the parameter is set in five discrete levels as described above using FIG. 5, five BL gammas corresponding to the respective levels of the parameter may be used. That is, various modifications can be made to the number and the shape of the BL gammas.

In the BL gammas, as can be appreciated from the example shown in FIG. 6, the output illumination ratio is set to a value close to its maximum value in a range where the input illumination ratio is close to its maximum value. In a narrow sense, if the input illumination ratio is maximum (100%), the output illumination ratio is also maximum (100%). As can be appreciated from Equation (3) described as an example above, an area where the input illumination ratio is higher is an area where the signal values of the input signals (for example, the area signal value) is larger. In summary, the backlight illumination ratio determiner 130 determines the illumination ratio so that areas corresponding to a high tone range, which includes input signals having a signal value of greater than or equal to a predetermined first signal threshold value, are assigned an illumination ratio of greater than or equal to a predetermined illumination ratio threshold value. As described above, in a narrow sense, the first signal threshold value is the maximum signal value (for example, 255), and the illumination ratio threshold value is the maximum value of the illumination ratio (100%). However, the present embodiment is not limited as such, and the first signal threshold value and the illumination ratio threshold value may be values that are smaller than their respective maximum values by a predetermined value or a predetermined percentage (for example, several percent). As described above, according to the method of the present embodiment, the backlight illumination ratio determiner 130 determines the illumination ratio of the backlight for each of the plurality of areas set on the display 150 by determining a BL gamma based on the surrounding environmental light condition. This configuration makes it possible to display areas where the signal values of the input signals are larger brighter.

The backlight illumination ratio determiner 130 may set the illumination ratio to a higher value for areas corresponding to an intermediate tone range, which includes input signals having a signal value of greater than a second signal threshold value and less than the first signal threshold value, in a case where the surroundings of the display apparatus 100 are determined to be bright based on the surrounding environmental light condition than in a case where the surroundings of the display apparatus 100 are determined to be dark. For example, in a case where gamma curves are used to associate the signal value (input illumination ratio) and the illumination ratio (output illumination ratio), the brighter the surroundings of the display apparatus 100 are, the smaller the value of γ is set. The intermediate tone range may be, for example, a range excluding input signals having the minimum and maximum values. In this case, the first signal threshold value is, for example, 255, and the second signal threshold value is, for example, 0. However, the signal threshold values are not limited as such, and the intermediate tone range may be narrower.

For example, three gamma curves are set as shown in FIG. 6: G-1, which is linear (γ=1); G-2, which is convex upward (γ<1); and G-3, which is convex downward (γ>1). In this case, G-2 is used when the surroundings of the display apparatus 100 are brighter than when G-1 is used, and G-3 is used when the surroundings of the display apparatus 100 are darker than when G-1 is used. For example, G-3 corresponds to a dark room, G-2 corresponds to a bright room, and G-1 corresponds to a room with intermediate brightness. For example, the surrounding environmental light condition is set in five levels as shown in FIG. 5. In this case, the BL gammas may be determined so that the value of γ corresponding to the levels decreases in the order of P0, P1, P2, P3, and P4. The linear BL gamma curve (G-1) may correspond to a room with intermediate brightness, the downward-convex BL gamma curve may correspond to a dark room, and the upward-convex BL gamma curve may correspond to a bright room. However, the present embodiment is not limited as such. For example, the linear BL gamma curve may correspond to a dark room, and all the other BL gamma curves may be convex upward.

According to the method of the present embodiment, the illumination ratio can be set to a value close to 100% for areas where the signal value is larger, i.e., areas desired to be displayed brighter, thus ensuring the brightness of such areas. Furthermore, with respect to the intermediate tone range, the illumination ratio of the backlight is adjusted depending on the brightness of the surroundings of the display apparatus 100, making it possible to display video suitable for the surrounding environment. For example, in a case where the surroundings of the display apparatus 100 are bright, the BL gamma curve having a smaller value of γ is used, resulting in a higher illumination ratio even in areas corresponding to the intermediate tone range than in a case where the surroundings of the display apparatus 100 are dark. As a result, the representation quality in a darker portion of the input image is improved. In a case where the surroundings of the display apparatus 100 are dark, the illumination ratio corresponding to the intermediate tone range is lower than in a case where the surroundings of the display apparatus 100 are bright, allowing reduction of black blooming. Furthermore, the illumination ratio corresponding to the high tone range is maintained at a high value even in a case where the surroundings of the display apparatus 100 are dark, preventing a decrease in the representation quality in a brighter portion of the input image.

Returning to FIG. 4, the following continues the description. After the backlight illumination ratio determiner 130 has determined the illumination ratio (output illumination ratio), the video tone determiner 160 corrects the signal values of the input signals based on the determined illumination ratio in Step S106. Specifically, the video tone determiner 160 corrects the signal value of each pixel in the input image based on Equation (1) shown above and outputs the corrected signal value to the display controller 140.

Figures 7, 8:
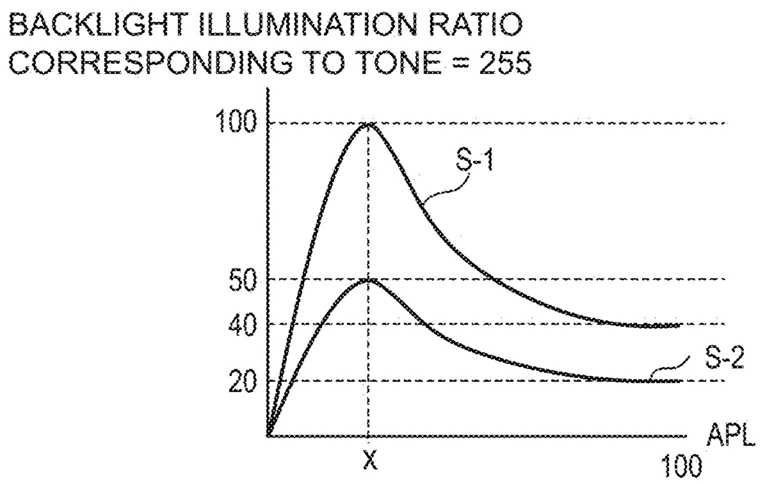
FIG. 7 is a diagram showing an example of characteristic curves to be used in a luminance stretching process.
FIG. 8 is a diagram showing an example of signal values of respective areas in local dimming.

In Step S107, the luminance stretcher 170 performs a luminance stretching process. FIG. 7 shows an example of characteristic curves to be used in the luminance stretching process. The horizontal axis in FIG. 7 represents average value of the input signals (APL: Average Picture Level). For example, one APL is determined based on one input image. The vertical axis in FIG. 7 represents maximum value of the illumination ratio of the backlight (%).

For example, a plurality of characteristic curves may be stored in the memory of the display apparatus 100. In this case, the luminance stretcher 170 selects one of the characteristic curves based on various information, and determines the maximum illumination ratio of the backlight based on the selected characteristic curve and the APL of one frame of input image. The luminance stretcher 170 may select a characteristic curve using the setting value of the brightness, which is one of user-configurable setting items of the display apparatus 100, or using the surrounding environmental light condition.

For example, in a case where a characteristic curve S-1 in FIG. 7 is selected and the APL of the input image is x, the maximum illumination ratio is 100%. Accordingly, the luminance stretcher 170 performs the correction process by multiplying the illumination ratio determined by the backlight illumination ratio determiner 130 by 100%. In this case, the illumination ratio determined for each area by the backlight illumination ratio determiner 130 is outputted to the display controller 140 without any changes. In a case where S-1 is selected but the APL is not x, or in a case where S-2 is selected, the value of the maximum illumination ratio is smaller than 100%. Accordingly, the luminance stretcher 170 performs the luminance stretching process so that the maximum illumination ratio determined based on the characteristic curve and the APL is set for areas where the output illumination ratio determined by the backlight illumination ratio determiner 130 is 100%. For example, the luminance stretcher 170 performs the correction process by multiplying the illumination ratio determined for each area by the backlight illumination ratio determiner 130 by the maximum illumination ratio determined based on the characteristic curve and the APL, and outputs the thus corrected illumination ratio to the display controller 140.

In Step S108, the display controller 140 performs control to cause the display 150 to display the input image by controlling the display 150 based on the signal value determined in Step S106 and the illumination ratio determined in Step S107.

The following describes the method according to the present embodiment using specific examples of the signal value and the illumination ratio. FIG. 8 shows an example of signal values of respective areas of an input image (for example, area signal values determined in accordance with Equation (2) shown above). The areas in this example each correspond to a unit area where the illumination ratio of the backlight can be individually controlled in the local dimming. In the example shown in FIG. 8, an upper left section of the input image has a first rectangular region including four areas where the signal value is maximum (255). A substantially central section of the input image has a second rectangular region including nine areas where the signal value is an intermediate value (128). A lower section of the input image has a band-like region including areas where the signal value is low (16). The signal value in the other areas is 0. In this case, according to Equation (3) shown above, for example, the input illumination ratio is 100% in the first rectangular region, 50% in the second rectangular region, and approximately 6.3% in the band-like region.

Figure 9:
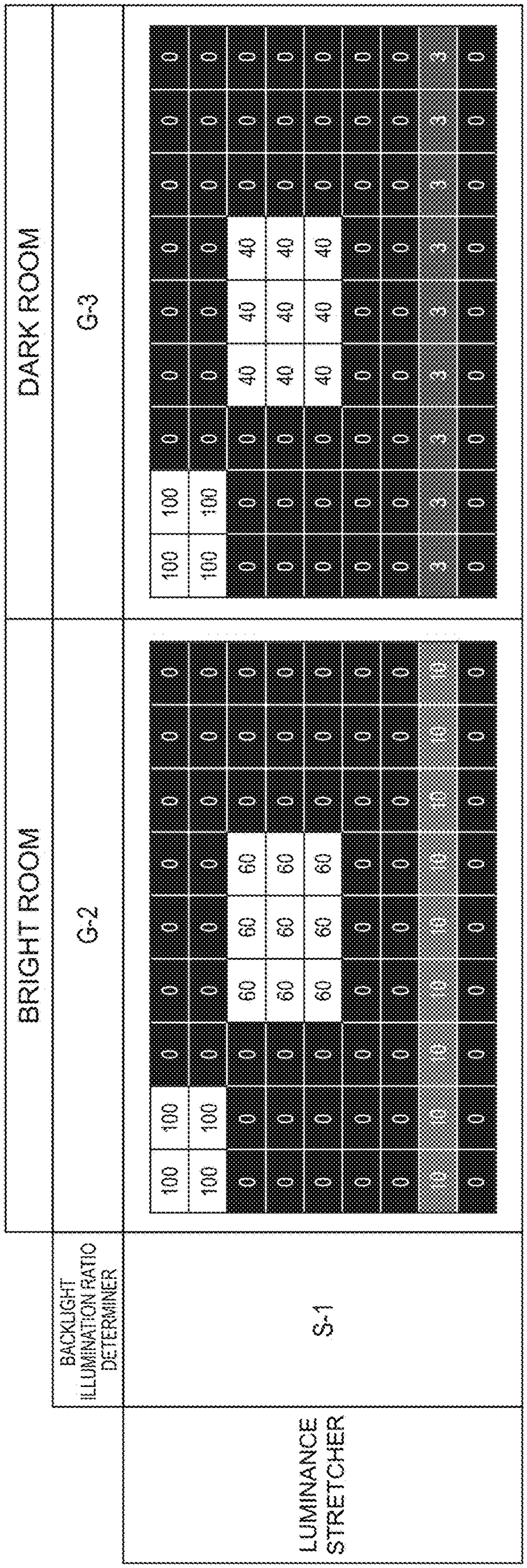
FIG. 9 is a diagram showing an example of the illumination ratio of a backlight determined depending on the brightness of the surroundings of the apparatus.

FIG. 9 shows an example of the illumination ratio determined based on the method according to the present embodiment. For example, the following discusses an example in which the luminance stretcher 170 uses the characteristic curve S-1 and the maximum illumination ratio is 100%. If the display apparatus 100 is determined to be in a bright room based on the surrounding environmental light condition, for example, the BL gamma curve G-2 in FIG. 6 is selected. In this case, in the first rectangular region, the output illumination ratio is maintained at a high value because the input illumination ratio is greater than or equal to a predetermined value (because the signal value is in the high tone range). Specifically, the output illumination ratio is 100%. In the second rectangular region and the band-like region, the output illumination ratio is higher than the input illumination ratio as a result of the process performed in accordance with the gamma curve G-2 because the input illumination ratio is neither zero nor the maximum value (because the signal value is in the intermediate tone range). For example, the output illumination ratio of the second rectangular region is 60%, and the output illumination ratio of the band-like region is 10%. As a result, even in a case where the surroundings of the display apparatus 100 are bright, the brightness of the areas corresponding to the intermediate tone range is adjusted to a higher level, thus improving the representation quality in a portion of the input image where the signal value is in the intermediate tone range (in a narrow sense, a darker portion of the input image).

If the display apparatus 100 is determined to be in a dark room based on the surrounding environmental light condition, for example, the BL gamma curve G-3 in FIG. 6 is selected. In this case, in the first rectangular region, the output illumination ratio is maintained at a high value because the input illumination ratio is greater than or equal to a predetermined value (because the signal value is in the high tone range). Specifically, the output illumination ratio is 100%. In the second rectangular region and the band-like region, the output illumination ratio is lower than the input illumination ratio as a result of the process performed in accordance with the gamma curve G-3. For example, the output illumination ratio in the second rectangular region is 40%, and the output illumination ratio in the band-like region is 3%. As a result, the brightness of the areas corresponding to the high tone range can be maintained even in a case where the surroundings of the display apparatus 100 are dark. Furthermore, according to the method of the present embodiment, the brightness of areas corresponding to the intermediate tone range is adjusted to a lower level, allowing reduction of black blooming.

According to a method in which the characteristic curves for luminance stretching are changed depending on the brightness of the surroundings, such as the aforementioned known method, the maximum illumination ratio of the backlight is adjusted. Reducing the brightness of areas corresponding to the intermediate tone range for black blooming reduction can therefore lead to a reduction in the illumination ratio corresponding to the high tone range. In other words, according to such a conventional method, the relative relationship between the illumination ratio corresponding to the high tone range and the illumination ratio corresponding to the intermediate tone range is invariable regardless of the brightness of the surroundings of the apparatus (for example, the BL gamma curve to use is fixed to one of G-1 to G-3), and it may not be easy to flexibly adjust the relative relationship. In this regard, according to the method of the present embodiment described above, it is possible to adjust the illumination ratio corresponding to the intermediate tone range depending on the brightness of the surroundings while maintaining the illumination ratio corresponding to the high tone range, and thus it is possible to flexibly change the relative relationship therebetween depending on the surrounding environmental light condition.

It should be noted that even in the method of the present embodiment, the processing by the luminance stretcher 170 may be performed as shown in FIG. 3, and the maximum illumination ratio can be corrected to a lower level. Even in such a case, according to the method of the present embodiment, it is possible to switch the relative relationship between the illumination ratio corresponding to the high tone range and the illumination ratio corresponding to the intermediate tone range depending on the brightness of the surroundings (for example, it is possible to switch the BL gamma curve to use between G-1 to G-3 depending on the brightness), and thus it is possible to increase image quality compared to conventional methods such as the aforementioned known method.

Some or all of the processes to be performed by the display apparatus 100 according to the present embodiment may be implemented using a program. The processes to be performed by the display apparatus 100 may be, for example, processes to be performed by the processor of the display apparatus 100, or in a narrow sense, processes to be performed by the surrounding environmental data processor 120, the backlight illumination ratio determiner 130, and the display controller 140.

The program according to the present embodiment may be stored in, for example, a non-transitory computer-readable information storage medium (information storage device). The information storage medium may be implemented by, for example, an optical disk, a memory card, an HDD, or semiconductor memory. The semiconductor memory is, for example, ROM. The display apparatus 100 performs the various processes according to the present embodiment based on the program stored in the information storage medium. That is, the information storage medium stores therein a program for causing a computer to function as the components of the display apparatus 100. The computer refers to a device including an inputter, a processor, a storage, and an outputter. Specifically, the program according to the present embodiment causes the computer to execute the steps described above with reference to some drawings including FIG. 4.

Specifically, the program causes the computer to function as the surrounding environmental data processor 120 that determines the surrounding environmental light condition including information representing the brightness of the surroundings based on the sensor value from the brightness sensor, the backlight illumination ratio determiner 130 that determines the illumination ratio of the backlight of the display 150 for each of a plurality of areas set on the display 150 based on input signals corresponding to an input image and the surrounding environmental light condition, and the display controller 140 that causes the display 150 to display the input image by illuminating the backlight of the display 150 based on the illumination ratio. As described above, the backlight illumination ratio determiner 130 determines the illumination ratio so that areas corresponding to the high tone range, which includes input signals having a signal value of greater than or equal to the first signal threshold value, are assigned an illumination ratio of greater than or equal to the illumination ratio threshold value. The program may also cause the computer to function as the video tone determiner 160 and the luminance stretcher 170.

Furthermore, the method of the present embodiment may be applied to a display control method. The display control method includes: receiving input signals corresponding to an input image; determining the surrounding environmental light condition based on data representing the brightness of the surroundings of the display apparatus; determining the illumination ratio of the backlight of the display 150 for each of a plurality of areas set on the display 150 based on the input signals and the surrounding environmental light condition; and causing the display 150 to display the input image by illuminating the backlight of the display 150 based on the illumination ratio. In the determining the illumination ratio of the backlight, the illumination ratio is determined so that areas corresponding to the high tone range, which includes input signals having a signal value of greater than or equal to the first signal threshold value, are assigned an illumination ratio of greater than or equal to the illumination ratio threshold value.

3. Modification Example

The following describes some modification examples.

3.1. Debouncing Filter

Figure 10:
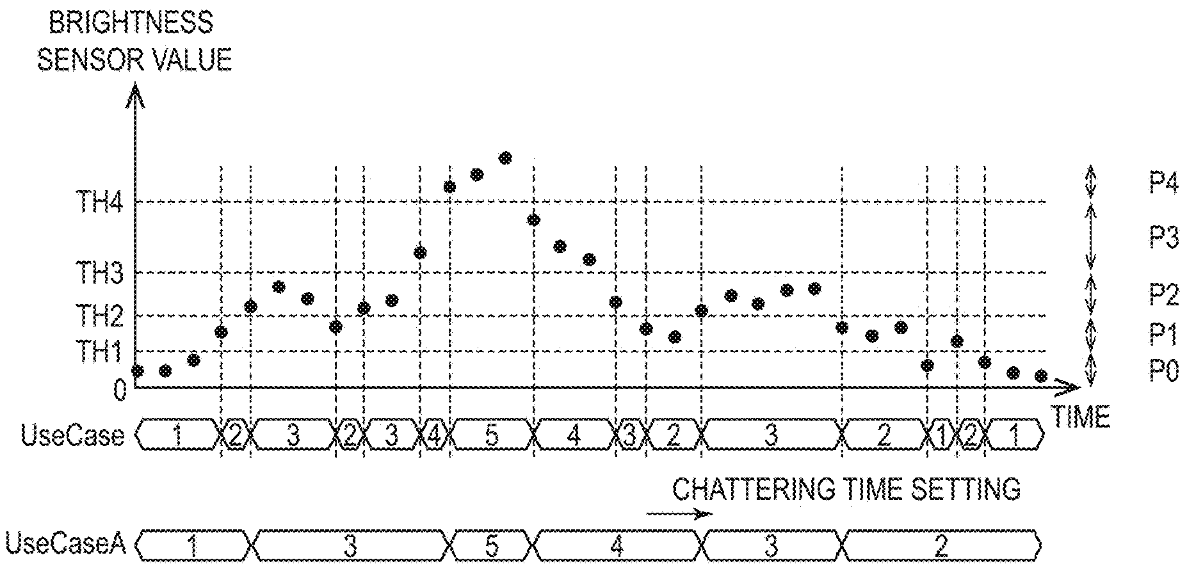
FIG. 10 is a diagram for explaining a process for reducing fluctuations of the surrounding environmental light condition over time.

The surrounding environmental data processor 120 may perform a process for reducing fluctuations in the surrounding environmental light condition. FIG. 10 is a schematic diagram for explaining such a fluctuation reduction process. In a graph shown in FIG. 10, the horizontal axis represents time, and the vertical axis represents sensor value from the brightness sensor. In FIG. 10, an acquisition of the sensor value at time 0 is defined as a first acquisition, and acquisitions of the sensor value at later times are defined as a second acquisition, a third acquisition, and so forth, in order. TH1 to TH4 on the vertical axis are the same threshold values as in FIG. 5. Accordingly, the parameter is determined to be one of P0 to P4 as the surrounding environmental light condition through the comparison between the sensor value and the threshold values. As in the example shown in FIG. 5, the parameter P0 corresponds to a dark room, which is referred to as Use Case 1. Likewise, P1 corresponds to a living room (morning/night), which is referred to as Use Case 2, P2 corresponds to a living room (daytime), which is referred to as Use Case 3, P3 corresponds to a living room (bright), which is referred to as Use Case 4, and P4 corresponds to a store, which is referred to as Use Case 5.

In the example shown in FIG. 10, the sensor value fluctuates frequently beyond a threshold value. The sensor value is, for example, less than TH1 in the first to third acquisitions, greater than or equal to TH1 and less than TH2 in the fourth acquisition, and greater than or equal to TH2 and less than TH3 in the fifth acquisition. Accordingly, as shown in FIG. 10 as "Use Case", use cases change frequently over time. Different use cases can result in different illumination ratios of the backlight between areas with the same signal value. If no measures are taken, therefore, this can lead to a decrease in image viewability.

The surrounding environmental data processor 120 may therefore correct use cases determined based on the sensor value by applying a debouncing filter to the use cases. For example, "Use Case A" in FIG. 10 represents a correction result obtained with debouncing time set by reflecting determination results only when the same determination results are obtained in three consecutive acquisitions. In this case, for example, since Use Case 2 in the fourth acquisition continues for only one acquisition long, the determination result from the fourth acquisition is not reflected in the correction result, so that Use Case 1 in the third acquisition is maintained also in the fourth acquisition. Similarly, although Use Cases 2, 3, and 4 are observed in the eighth to eleventh acquisitions, Use Case 3 before these acquisitions is maintained because none of the use cases continues for three acquisitions long. The same applies to the subsequent acquisitions. The application of the debouncing filter reduces frequent use case fluctuations, i.e., frequent fluctuations in the illumination ratio of the backlight. As a result, it is possible to prevent displayed images from decreasing in viewability and from giving users a feeling of strangeness.

3.2. Processing Depending on Video Genre, Etc.

The surrounding environmental data processor 120 may also change the process for determining the environmental light condition, based on the genre of the input image. For example, the surrounding environmental data processor 120 may change the process to be performed based on the sensor value from the brightness sensor. The genre of the input image may be obtained by the receiver 110 as information accompanying the input signals, may be inputted by a user, or may be determined through image processing on the input signals. This configuration makes it possible to display video by taking into account the genre of the input signals as well as the surrounding environmental light condition.

For example, in a case where the genre of the input image is movies, users tend to prefer darker video to be displayed. In a case where the genre of the input image is sports, users tend to prefer brighter video to be displayed, so that it is easier for the users to see fast or vigorous actions of players. For example, the memory of the display apparatus 100 may store therein information indicating the association between the genre of the input image and preferred video. Based on such information and the genre of the input image, the surrounding environmental data processor 120 changes the process for determining the surrounding environmental light condition.

Figure 11A:
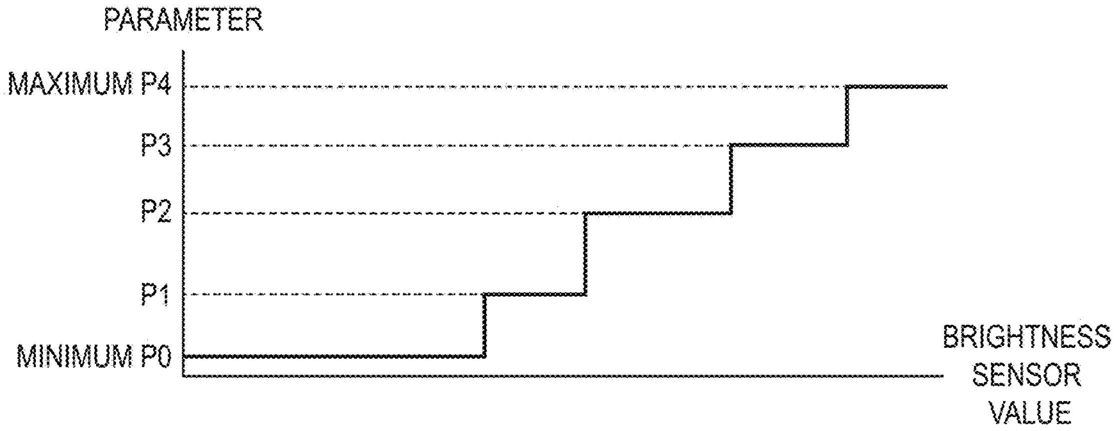
FIG. 11A is a diagram showing an example of the relationship between the sensor value from the brightness sensor and the surrounding environmental light condition.
Figure 11B:
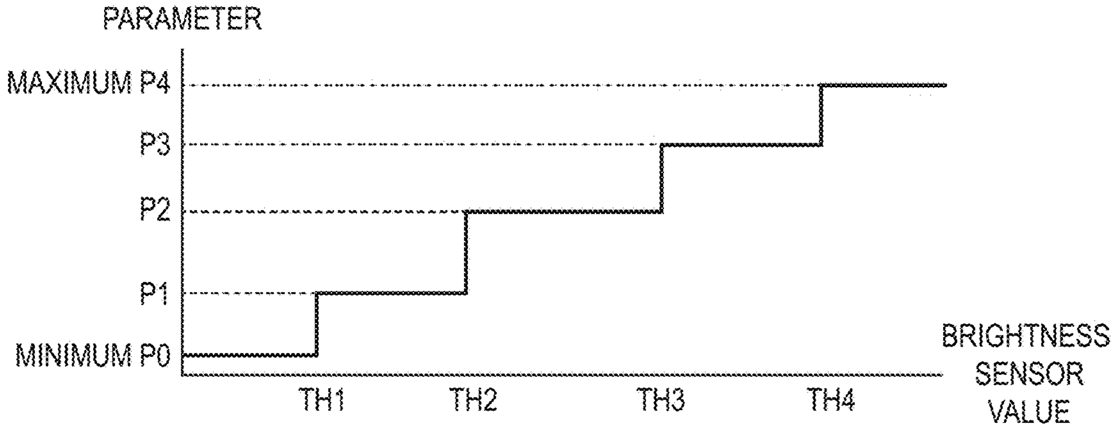
FIG. 11B is a diagram showing an example of the relationship between the sensor value from the brightness sensor and the surrounding environmental light condition.
Figure 11C:
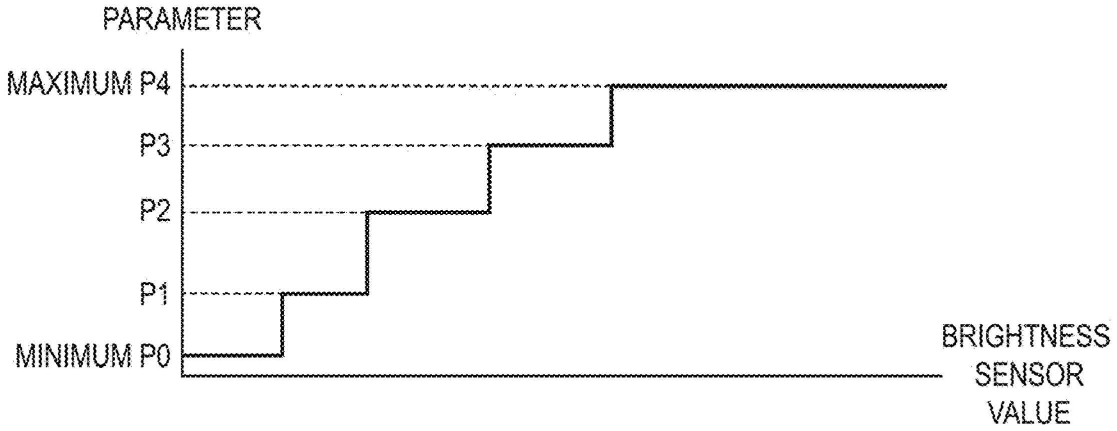
FIG. 11C is a diagram showing an example of the relationship between the sensor value from the brightness sensor and the surrounding environmental light condition.

FIGS. 11A to 11C are schematic diagrams for explaining processing in the surrounding environmental data processor 120, each of which shows an example of the relationship between the sensor value from the brightness sensor and the surrounding environmental light condition. FIG. 11B is a diagram for explaining a process for determining the parameter (use case) based on the four threshold values TH1 to TH4 as in the example described above with reference to FIG. 5. In the example shown in FIG. 11A, at least one threshold value is set to a larger value than in the example shown in FIG. 11B. In the example shown in FIG. 11A, therefore, the sensor value is less likely to exceed the threshold value, and thus it is more likely that the parameter is determined to be lower than in the example shown in FIG. 11B. In the example shown in FIG. 11C, at least one threshold value is set to a smaller value than in the example shown in FIG. 11B. In the example shown in FIG. 11C, therefore, the sensor value is more likely to exceed the threshold value, and thus it is more likely that the parameter is determined to be higher than in the example shown in FIG. 11B.

For example, upon determining that the genre of the input image is movies or any other genre that suggests a preference for darker video, the surrounding environmental data processor 120 may determine the parameter based on the relationship shown in FIG. 11A. In this case, for example, a downward-convex BL gamma curve is more likely to be used, and thus a lower illumination ratio of the backlight is set for areas corresponding to the intermediate tone range. As a result, darker video suitable for the genre is displayed.

For another example, upon determining that the genre of the input image is sports or any other genre that suggests a preference for brighter video, the surrounding environmental data processor 120 may determine the parameter based on the relationship shown in FIG. 11C. In this case, for example, an upward-convex BL gamma curve is more likely to be used, and a higher illumination ratio of the backlight is set for areas corresponding to the intermediate tone range. As a result, brighter video suitable for the genre is displayed.

For another example, upon determining that the genre of the input image is one that suggests a preference for video with intermediate brightness, the surrounding environmental data processor 120 may determine the parameter based on the relationship shown in FIG. 11B. An example in which at least one threshold value is changed according to the genre has been described above. However, the method of the present embodiment is not limited as such, and various methods that involve changing the relationship to refer to between the sensor value and the surrounding environmental light condition (parameter) can be employed.

The surrounding environmental data processor 120 may consider the source of the input signals to change the process for determining the surrounding environmental light condition to be performed based on the sensor value. The source of the input signals is an object from which the receiver 110 acquires the input signals. Examples thereof include a facility that transmits broadcast waves for television broadcast (for example, a broadcast tower), a BD player, and a gaming device.

In a case where the input signals are supplied from a gaming device, for example, a game screen is to be displayed. It is therefore highly probable that the user prefers brighter video to be displayed. In this case, therefore, the surrounding environmental data processor 120 determines the parameter based on the relationship shown in FIG. 11C.

For another example, the receiver 110 may additionally receive information about the video frame rate when obtaining the input signals. In this case, the surrounding environmental data processor 120 may acquire such frame rate information and perform the process for determining the surrounding environmental light condition based on the acquired frame rate. For example, in a case where the frame rate is 24 fps, it is highly probable that the input signals correspond to a movie. This suggests a preference for darker video, and thus the surrounding environmental data processor 120 may determine the parameter based on the relationship shown in FIG. 11A. In a case where the frame rate is 60 fps, it is highly probable that the input signals correspond to general content other than a movie. Accordingly, the surrounding environmental data processor 120 may determine the parameter based on the relationship shown in FIG. 11B or FIG. 11C. The frame rate may be determined based on the source of the input signals. For example, the surrounding environmental data processor 120 may determine which of FIGS. 11A to 11C to use based on information that associates sources of input signals with frame rates.

The surrounding environmental data processor 120 may consider an image quality setting in the display apparatus 100 to change the process for determining the surrounding environmental light condition to be performed based on the sensor value. Examples of possible image quality settings include "standard" and "dynamic" for displaying vivid video. Furthermore, settings suitable for the genre and the source of the input signals may be available as items of the image quality settings. Examples of such image quality settings include "movies", "sports", and "games".

In the case of the image quality setting "standard", the surrounding environmental data processor 120 determines the parameter based on the relationships shown in FIG. 11B, which represents the intermediate characteristic. In the case of the image quality setting "dynamic", which suggests a preference for brighter video, the surrounding environmental data processor 120 may determine the parameter based on the relationship shown in FIG. 11C.

With respect to the settings such as "movies", for example, the surrounding environmental data processor 120 may perform the process in the same manner as in the examples in which the genre or the source of the input signals is considered. For example, the surrounding environmental data processor 120 determines the parameter based on the relationship shown in FIG. 11A in the case of the image quality setting "movies", and determines the parameter based on the relationship shown in FIG. 11C in the case of the image quality setting "sports" or "games".

As described above, considering information such as the genre, the source of the input signals, or the image quality setting in addition to the surrounding environmental light condition makes it possible to display video that is more preferable for the user on the display 150.

3.3. Adjustment of BL Gamma Depending on Luminance Stretching

As described above with reference to FIG. 3, the display apparatus 100 may include the luminance stretcher 170 that performs the correction process on the illumination ratio determined by the backlight illumination ratio determiner 130.

For example, the luminance stretcher 170 may consider the setting value of the brightness determined through a user's operation to perform the correction process on the illumination ratio determined by the backlight illumination ratio determiner 130. For example, setting items of the display apparatus 100 include "brightness setting", and the user enters a setting value of this setting item. In this example, the setting value may be a specific numerical value such as 0 to 100, or may be one of discrete levels such as bright, standard, or dark. The luminance stretcher 170 determines the characteristic curves shown in FIG. 7 so that the peak value is larger in a case where the setting value of the brightness is larger (brighter) than in a case where the setting value of the brightness is smaller (darker). This configuration makes it possible to control the illumination ratio depending on a setting configured by the user.

The luminance stretcher 170 may consider the surrounding environmental light condition to perform the correction process on the illumination ratio determined by the backlight illumination ratio determiner 130. For example, the luminance stretcher 170 determines the characteristic curves shown in FIG. 7 so that the peak value is larger in a case where the surroundings of the display apparatus 100 is determined to be bright based on the surrounding environmental light condition than in a case where the surroundings of the display apparatus 100 is determined to be dark based on the surrounding environmental light condition. This configuration makes it possible to control the maximum illumination ratio depending on the brightness of the surroundings. The luminance stretcher 170 may consider both the setting value of the brightness and the surrounding environmental light condition to perform the correction process.

In a configuration in which the luminance stretcher 170 performs the correction process as described above, the backlight illumination ratio determiner 130 may determine the output illumination ratio by considering what is done in the correction process. Specifically, the backlight illumination ratio determiner 130 may determine the BL gamma based on the settings of the luminance stretcher 170.

Figure 12:
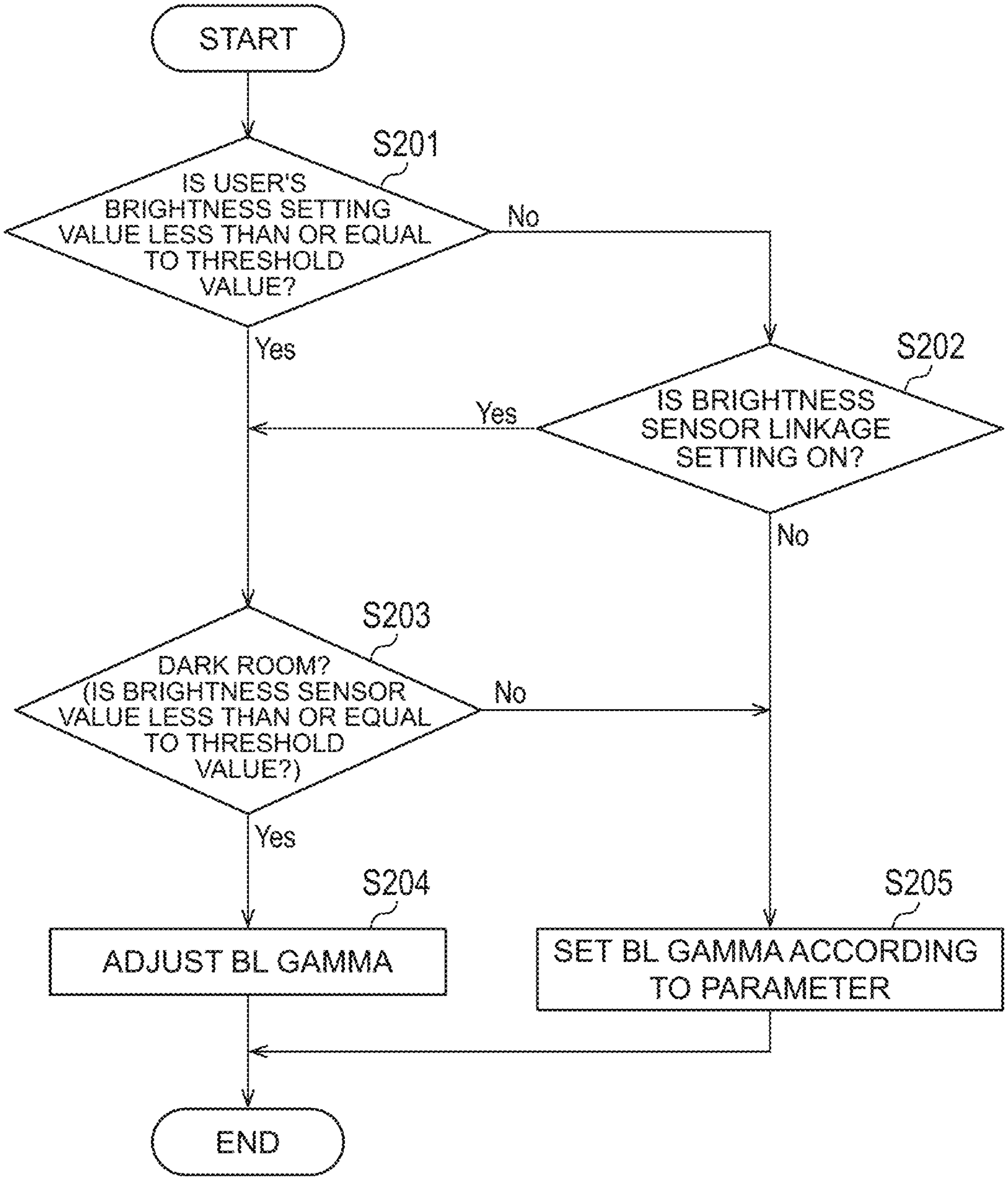
FIG. 12 is a flowchart for explaining a process for adjusting a BL gamma (backlight gamma) depending on settings for a luminance stretcher.

FIG. 12 is a flowchart for explaining the process for adjusting the BL gamma depending on the luminance stretching. First, in Step S201, the backlight illumination ratio determiner 130 determines whether or not the setting value of the brightness configured by the user is less than or equal to a predetermined threshold value. For example, user-configurable setting items and setting values associated with the respective user-configurable setting items are stored in the memory of the display apparatus 100. The backlight illumination ratio determiner 130 performs a process for comparing the setting value associated with "brightness setting" with the predetermined threshold value in Step S201.

If the setting value of the brightness is greater than the threshold value (No in Step S201), the luminance stretcher 170 determines whether or not a brightness sensor linkage setting is on. The brightness sensor linkage setting represents a setting for causing the luminance stretcher 170 to perform the correction process depending on the sensor value from the brightness sensor (surrounding environmental light condition). That is, the luminance stretcher 170 performs the correction process depending on the surrounding environmental light condition if the brightness sensor linkage setting is on, and does not if the brightness sensor linkage setting is off. It should be noted that the term on/off herein can be rephrased as active/inactive.

If the setting value of the brightness is less than or equal to the threshold value (Yes in Step S201) or the brightness sensor linkage setting is on (Yes in Step S202), the backlight illumination ratio determiner 130 determines whether or not the use case corresponds to a dark room based on the surrounding environmental light condition in Step S203. In the example shown in FIG. 5, the backlight illumination ratio determiner 130 may determine whether or not the parameter obtained from the surrounding environmental data processor 120 is P0.

Upon determining that the use case corresponds to a dark room (Yes in Step S203), the backlight illumination ratio determiner 130 adjusts the BL gamma. Specifically, the backlight illumination ratio determiner 130 adjusts the BL gamma so that the output illumination ratio corresponding to at least a portion of the intermediate tone range is higher in accordance with the adjusted gamma than in accordance with the BL gamma corresponding to the dark room case (parameter=P0). For example, the backlight illumination ratio determiner 130 may perform a process for decreasing the value of $\gamma$ in Step S204. For example, if the BL gamma corresponding to P0 is linear ($\gamma$=1), the BL gamma is corrected to an upward convex shape through the process in Step S204. Alternatively, the backlight illumination ratio determiner 130 may perform a process for selecting a BL gamma corresponding to any of P1 to P4 (in a narrow sense, the BL gamma corresponding to P1) even if the parameter is P0.

If the setting value of the brightness is greater than the threshold value (No in Step S201) and the brightness sensor linkage setting is off (No in Step S202), the backlight illumination ratio determiner 130 determines the BL gamma depending on the surrounding environmental light condition (parameter) in Step S205.

As described above, the backlight illumination ratio determiner 130 may set the illumination ratio to a higher value for areas where the input signals have a signal value of less than the first signal threshold value in a case where the setting value of the brightness, which is used in the luminance stretcher 170, is less than or equal to the predetermined threshold value (Yes in Step S201, S204) than in a case where the setting value of the brightness is greater than the predetermined threshold value (No in Step S201, S205). In a case where the setting value of the brightness is less than or equal to the threshold value, the luminance stretching process works to set the maximum illumination ratio of the backlight to a lower value, which may result in displaying darker video. In this regard, according to the method of the present embodiment, the BL gamma is adjusted so as to increase the illumination ratio corresponding to the intermediate tone range. As a result, the representation quality in a darker portion of the input image can be improved.

Similarly, the backlight illumination ratio determiner 130 may set the illumination ratio to a higher value for areas where the input signals have a signal value of less than the first signal threshold value in a case where the correction process in the luminance stretcher 170 based on the surrounding environmental light condition is active (Yes in Step S202, S204) than in a case where the correction process is inactive (No in Step S202, S205). In a case where the brightness sensor linkage setting is on, the luminance stretching process for the use case corresponding to a dark room works to set the maximum illumination ratio of the backlight to a lower value, which results in displaying darker video. In this regard, according to the method of the present embodiment, the BL gamma is adjusted so as to increase the illumination ratio corresponding to the intermediate tone range. As a result, the representation quality in a darker portion of the input image can be improved.

3.4. Adjustment of BL Gamma Depending on Color Temperature

The backlight illumination ratio determiner 130 may acquire the brightness of the surroundings and information representing the color temperature of surrounding environmental light as the surrounding environmental light condition. For example, in addition to the illuminance meter (photodiode, for example) that detects the brightness, the display apparatus 100 may include an RGB sensor that detects light in different wavelength bands corresponding to RGB. The RGB sensor herein may be an image sensor included in a camera. The surrounding environmental data processor 120 determines the color temperature based on an output form the RGB sensor and outputs the determination result to the backlight illumination ratio determiner 130 as the surrounding environmental light condition. It should be noted that a known method is employed for determining the color temperature based on the output from the RGB sensor, and therefore detailed description thereof is omitted. The backlight illumination ratio determiner 130 according to the present embodiment may determine the illumination ratio of the backlight based on the brightness and the color temperature.

For example, warm-color lighting is likely to be used in a home theater, while cool-color lighting is likely to be used in a living room. Thus, if the surrounding environmental light is determined to be resulting from warm-color lighting based on the color temperature, the display apparatus 100 can be presumed to be located in a home theater. In this case, it is highly probable that darker video is preferred because a movie is displayed on the display apparatus 100. If the surrounding environmental light is determined to be resulting from cool-color lighting based on the color temperature, the display apparatus 100 can be presumed to be located in a living room. In this case, it is highly probable that brighter video is preferred compared to the case of a home theater. Considering the color temperature therefore allows for control of the backlight in a way that suits the environment in which the display apparatus 100 is placed.

Cool-color lighting is more likely to seem brighter to the user's eyes than warm-color lighting even at the same luminous intensity. Considering the color temperature therefore allows for control of the backlight in a way that suits the brightness as perceived subjectively by the user even if the detection result from the illuminance meter is the same. For example, in the case of a room with cool-color lighting, the representation quality in a darker portion of the input image can be improved by displaying relatively bright video. In the case of a room with warm-color lighting, black blooming can be reduced by displaying relatively dark video.

For example, the backlight illumination ratio determiner 130 may first determine a BL gamma based on the brightness, and then correct the BL gamma based on the color temperature. Specifically, in the case of a lower color temperature (in the case of warm-color lighting), the backlight illumination ratio determiner 130 performs a correction process for increasing the value of $\gamma$ determined based on the brightness. In the case of a higher color temperature (in the case of cool-color lighting), the backlight illumination ratio determiner 130 performs a correction process for decreasing the value of $\gamma$ determined based on the brightness.

However, the processing with the use of the brightness and the color temperature is not limited as such. For example, the surrounding environmental data processor 120 may pre-set a function f having both the brightness and the color temperature as variables, and perform a process for determining the surrounding environmental light condition (parameter) based on the function f. Various other modifications may be made to the processing based on the color temperature.

3.5. Adjustment of BL Gamma Depending on Time of Day

The backlight illumination ratio determiner 130 may determine the illumination ratio of the backlight based on the input signals, the surrounding environmental light condition, and information representing time of day in which the display apparatus 100 is used. This configuration allows for control of the backlight that takes into account the characteristics of the time of day in which the display apparatus 100 is used.

Figure 13A:
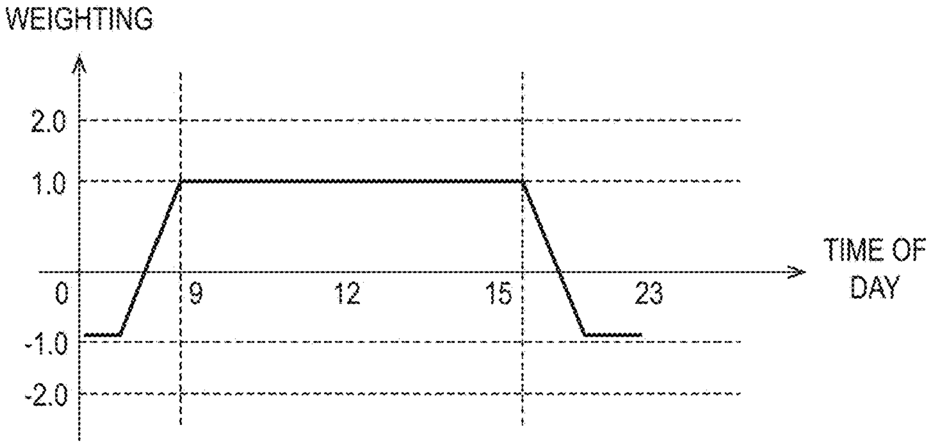
FIG. 13A is a diagram for explaining a process for adjusting a BL gamma depending on time of day.
Figure 13B:
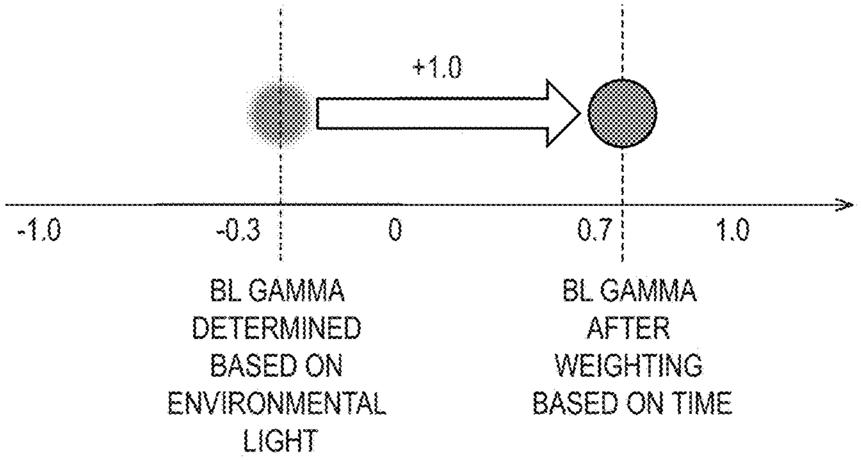
FIG. 13B is a diagram for explaining the process for adjusting a BL gamma depending on time of day.

FIG. 13A is a diagram showing an example of the relationship between time of day and weighting for the illumination ratio. The horizontal axis in FIG. 13A represents time of day (clock time), and the vertical axis represents correction factor for BL gammas. For example, the information shown in FIG. 13A is stored in the memory of the display apparatus 100, and the backlight illumination ratio determiner 130 may determine the weighting of change based on this information and the current time obtained by a timekeeper included in the display apparatus 100. FIG. 13B is a diagram for explaining a BL gamma correction process based on the weighting. For example, the backlight illumination ratio determiner 130 may add a weight determined based on the time of day to the BL gamma determined based on the surrounding environmental light condition. In the example shown in FIG. 13B, the value of $\gamma$ of the BL gamma determined based on the surrounding environmental light condition is −0.3, and the weighting of change is +1.0. Accordingly, the value of $\gamma$ is set to +0.7 through the correction. Although an example in which the weight is added is described using FIGS. 13A and 13B, the BL gamma may be corrected by changing the value of the vertical axis in FIG. 13A and multiplying the value by a weight based on the time of day.

In the example shown in FIG. 13A, the weighting of change in the 0 o'clock hour is set to a low value, and the weighting of change increases with time toward the 9 o'clock hour. The high weighting of change is maintained from the 9 o'clock hour to the 15 o'clock hour, and the weighting of change decreases with time from the 15 o'clock hour to the 23 o'clock hour.

The following discusses, for example, a configuration in which the brightness sensor is provided on the front side of the display apparatus 100 and a window is provided on the back side of the display apparatus 100. In this case, the user viewing the display 150 of the display apparatus 100 can recognize outside light (referred to below as "outdoor light") through the window because the window at the back is in view. During daytime hours (for example, from the 9 o'clock hour to the 15 o'clock hour), the outdoor light is stronger, and consequently the surroundings of the display apparatus 100 seem brighter to the user. As a result, the viewability may decrease unless brighter video is displayed. However, in the configuration in which the brightness sensor is located on the front side, the outdoor light may not adequately reach the brightness sensor. In this case, the sensor value from the brightness sensor can fail to reflect the actual brightness of the surroundings of the display apparatus 100, which seem bright to the user, providing information mainly corresponding to indoor light.

In this regard, as long as the information shown in FIG. 13A is used, the weighting of change is set to a higher value for daytime hours, and thus the display apparatus 100 controls the BL gamma determined based on the sensor value from the brightness sensor so that the illumination ratio corresponding to the intermediate tone range is increased. This configuration allows for appropriate representation in a darker portion of the image even in a case where the surroundings of the display apparatus 100 appear bright due to outdoor light, improving the image quality. The influence of outdoor light is not so significant during non-daytime hours. It is therefore possible to prevent or reduce black blooming by setting the weighting of change to relatively low values as shown in FIG. 13A.

The outdoor brightness varies depending on the weather. For example, even during the same daytime hours, the influence of sunlight is greater on sunny days than cloudy or rainy days. Accordingly, the backlight illumination ratio determiner 130 may adjust the BL gamma based on weather information in addition to the information representing time of day. For example, the backlight illumination ratio determiner 130 may set the weighting of change to a higher value in a case where the weather is determined to be sunny than in a case where the weather is determined to be cloudy or rainy. The weather information may be obtained from the Internet or other sources via a communication interface (receiver) or based on data broadcasting included in broadcast waves.

Furthermore, according to the present embodiment, the illumination ratio of the backlight may be controlled depending on the user's daily rhythm (biological clock). For example, the backlight illumination ratio determiner 130 sets the illumination ratio of the backlight to a higher value in a case where the time of day in which the display apparatus 100 is used corresponds to the user's wake-up time than in a case where the time of day in which the display apparatus 100 is used corresponds to the user's bedtime. The wake-up time herein may be a specific wake-up clock time or a certain length of period of time. The same is true for the bedtime. The wake-up time and the bedtime may be settable on a user-by-user basis.

For example, the backlight illumination ratio determiner 130 may set a magnification factor to be applied to the BL gamma to a relatively high value for a time of day corresponding to the wake-up time and to a relatively low value for a time of day corresponding to the bedtime. This configuration makes it possible to display brighter video at or during the wake-up time to encourage the user to wake up smoothly. This configuration also makes it possible to display darker video at or during the bedtime to avoid interfering with the user's ability to fall asleep.

3.6. Adjustment of BL Gamma Depending on Priority in Area Signal Value Determination As described above, the backlight illumination ratio determiner 130 may perform a process for determining a signal value of the input signals for each of the plurality of areas based on the maximum value and the average value of the input signals in the area. For example, the backlight illumination ratio determiner 130 determines the area signal value based on Equation (2) shown again below.

$$\text{Area signal value}=\alpha\times\text{maximum value}+(1-\alpha)\times\text{average value} \tag{2}$$

In this example, the backlight illumination ratio determiner 130 may determine the illumination ratio of the backlight based on the relationship between the priority of the maximum value and the priority of the average value in the process for determining the signal value. The priority herein is, for example, the contribution of the maximum value and the contribution of the average value to the signal value to be determined, and may be information to be determined using a in Equation (2) shown above. For example, the priority of the maximum value is a, and the priority of the average value is $1-\alpha$.

For example, the backlight illumination ratio determiner 130 may perform a process for setting the illumination ratio corresponding to the intermediate tone range to a lower value in a case where the priority of the maximum value is greater than or equal to a predetermined threshold value than in a case where the priority of the maximum value is less than this threshold value. For example, the backlight illumination ratio determiner 130 selects a linear BL gamma regardless of the surrounding environmental light condition if the priority of the maximum value is greater than or equal to the threshold value, and selects a BL gamma out of BL gammas that are determined depending on the surrounding environmental light condition if the priority of the maximum value is less than the threshold value.

For example, the following discusses an example in which low-luminance pixels account for a large portion of an area of interest in the local dimming and the area has only one pixel having a high luminance value. In this case, the maximum value is large and the average value is sufficiently small in comparison. In this example, giving high priority to the maximum value results in a large area signal value and a high input illumination ratio, and consequently tends to result in a high output illumination ratio. In this case, the portion with a large signal value is properly displayed, but black blooming can occur in the other portion, which is a darker portion, due to the high illumination ratio of the backlight. In this regard, according to the method of the present embodiment, the output illumination ratio corresponding to the intermediate tone range is adjusted to a lower value (the value of $\gamma$ of the BL gamma is set to a larger value) in a situation where the maximum value takes priority, so that black blooming can be reduced.

3.7. Other Example of Curve Form

So far, the BL gammas have been described as a specific example of the association information indicating the association between the signal value and the illumination ratio, and a linear shape (G-1 in FIG. 6), an upward convex shape (G-2), and a downward convex shape (G-3) have been described as examples of the shape of the BL gammas. However, no particular limitations are placed on the specific form of the association information in the present embodiment, as long as the association information associates the signal value (or the input illumination ratio determined from the signal value) with the illumination ratio (output illumination ratio).

Figure 14:
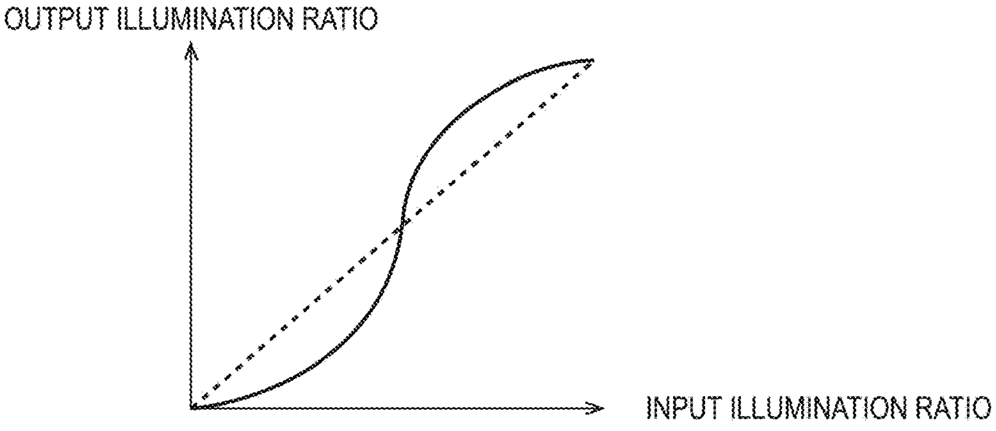
FIG. 14 is a diagram showing another example of the relationship between the input illumination ratio and the output illumination ratio.

FIG. 14 is a diagram showing another example of the association information. As shown in FIG. 14, the association information may be a characteristic curve having an S-curve shape. In the example shown in FIG. 14, lower values of the output illumination ratio are associated with small signal values (downward convex) than in the case of a linear characteristic curve, and higher values of the output illumination ratio are associated with large signal values (upward convex) than in the case of a linear characteristic curve.

The association information shown in FIG. 14 may be used, for example, if the use case is determined to be corresponding to a dark room based on the surrounding environmental light condition. For example, the backlight illumination ratio determiner 130 selects the characteristic curve shown in FIG. 14 as the association information if the sensor value from the brightness sensor is less than a predetermined threshold value (for example, TH1 in FIG. 5). In the example shown in FIG. 14, among the plurality of areas, areas with a larger signal value are displayed brighter because the illumination ratio therein is higher, and areas with a smaller signal value are displayed darker because the illumination ratio therein is lower.

Consequently, in a case where the surroundings of the display apparatus 100 are dark, a brighter portion is more illuminated to be more viewable while a darker portion is prevented from causing black blooming, thus allowing for an improvement in contrast.

3.8. Per-Area BL Gamma

As described above, the association information (BL gamma) is determined based on the surrounding environmental light condition and is information that is applied to the entirety of a single input image. For example, the backlight illumination ratio determiner 130 determines the output illumination ratio for each area by selecting one of G-1 to G-3 in FIG. 6 based on the surrounding environmental light condition and applying the selected BL gamma to all of the plurality of areas. However, the processing in the present embodiment is not limited as such.

For example, the backlight illumination ratio determiner 130 may perform a process for determining area association information in addition to the process for determining the association information common to the plurality of areas based on the surrounding environmental light condition. The association information is as described above. The area association information refers to information that indicates the association between the signal value of the input signals and the illumination ratio in each of the plurality of areas, and is determined for each individual area.

For example, the backlight illumination ratio determiner 130 may determine the area association information for an area of interest based on the signal value of the area among the input signals. For example, the backlight illumination ratio determiner 130 may determine the area association information based on the signal value acquired at a single point in time or based on time-series signal values acquired in different points in time. For example, the backlight illumination ratio determiner 130 determines the area signal value based on Equation (2) and determines the area association information based on the area signal value acquired at a single point in time or the time-series area signal values. For example, the backlight illumination ratio determiner 130 determines the area association information so that the output illumination ratio corresponding to the intermediate tone range is higher (the value of $\gamma$ is smaller) in a case where the area signal value is large than in a case where the area signal value is small.

Figure 15:
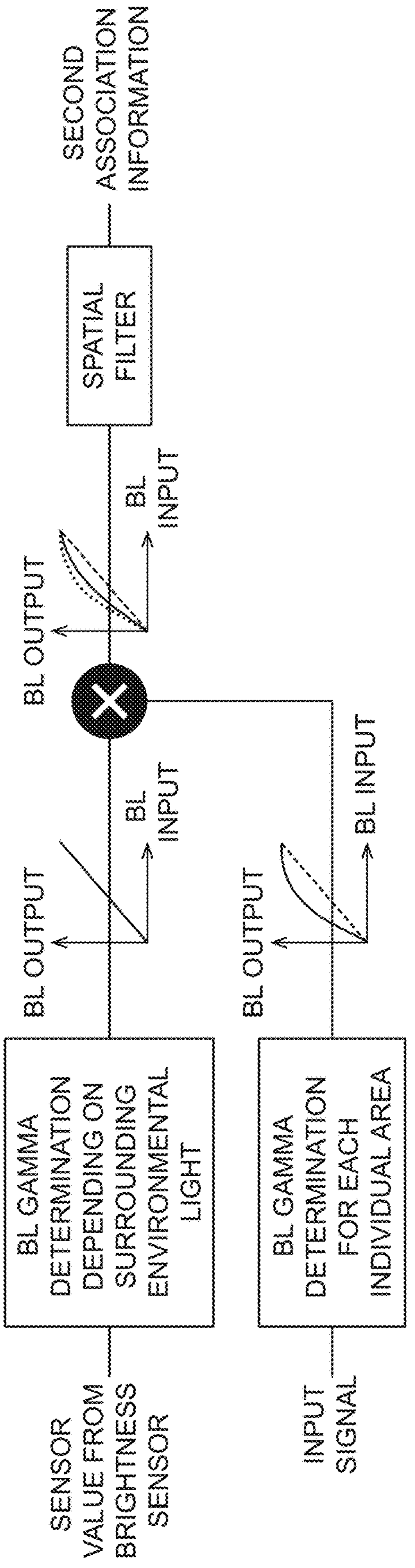
FIG. 15 is a diagram for explaining a process for determining a BL gamma for each area.

FIG. 15 is a diagram for explaining a process based on the association information common to all the areas of the input image and the area association information. As described above, the backlight illumination ratio determiner 130 determines the common association information based on the surrounding environmental light condition and determines the area association information for each area based on the signal value of the input signals. The backlight illumination ratio determiner 130 then determines, based on the association information and the area association information, second association information indicating the association between the signal value of the input signals and the illumination ratio for each of the plurality of areas. For example, the backlight illumination ratio determiner 130 may determine the second association information through mutual reference to the common association information and the area association information for each of the plurality of areas. For example, the backlight illumination ratio determiner 130 may determine the value of $\gamma$ in the second association information in accordance with $(\gamma 1+\gamma 2)/2$, where $\gamma 1$ is the value of $\gamma$ in the common association information, and $\gamma 2$ is the value of $\gamma$ in the area association information.

The backlight illumination ratio determiner 130 then determines the output illumination ratio for each of the plurality of areas based on the second association information and the signal value of the area. This configuration makes it possible to determine the output illumination ratio based on a plurality of pieces of association information obtained from different perspectives.

In the configuration in which the association information is obtained for each area, however, illumination ratio differences may occur at boundaries between areas, which can give the user a feeling of strangeness. The backlight illumination ratio determiner 130 may therefore obtain the second association information by applying a spatial filter as shown in FIG. 15. The spatial filter herein may be a Gaussian filter, an averaging filter, or any other filter. The use of a spatial filter allows for correction of the second association information based on information about surrounding areas. Thus, it is possible to reduce abrupt changes in the illumination ratio at the boundaries of areas, allowing the display apparatus 100 to display natural video.

Although the present embodiment has been described above in detail, those skilled in the art will easily understand that a number of modifications can be made within a range not substantially departing from the novelties and effects of the present embodiment. Therefore, all such modifications are included in the scope of the present disclosure. For example, a term described in the specification or drawings at least once together with a term having a broader meaning or the same meaning may be replaced with the different term anywhere in the specification or drawings. All combinations of the present embodiment and modifications are also included in the scope of the present disclosure. The configuration, operation, and the like, of the display apparatus are also not limited to those described in the present embodiment, and various modifications can be made thereto.

What is claimed is:

1. A display apparatus comprising:

at least one processor;

at least one non-transitory computer-readable medium coupled to the at least one processor and storing one or more computer-executable instructions;

a display that displays an image; and a receiver that receives input signals corresponding to an input image, wherein the one or more computer-executable instructions, when executed by the at least one processor, cause the display apparatus to:

determine a surrounding environmental light condition including information representing a brightness of surroundings of the display apparatus;

determine, for each of a plurality of areas set on the display, an illumination ratio of a backlight of the display based on the input signals and the surrounding environmental light condition;

cause the display to display the input image by illuminating the backlight of the display based on the illumination ratio, wherein the illumination ratio is determined, such that areas corresponding to a high tone range are assigned an illumination ratio of greater than or equal to an illumination ratio threshold value, the high tone range including input signals having a signal value of greater than or equal to a first signal threshold value; and set the illumination ratio to a higher value for areas corresponding to an intermediate tone range in a case where the surroundings of the display apparatus are determined to be bright based on the surrounding environmental light condition than in a case where the surroundings of the display apparatus are determined to be dark, the intermediate tone range including input signals having a signal value of greater than or equal to a second signal threshold value and less than the first signal threshold value.

2. The display apparatus according to claim 1, wherein the one or more computer-executable instructions, when executed by the at least one processor, further cause the display apparatus to:

determine, based on the surrounding environmental light condition, association information indicating association between the signal values of the input signals and the illumination ratio; and determine the illumination ratio for each of the plurality of areas based on the determined association information and the input signals.

3. The display apparatus according to claim 2, wherein the one or more computer-executable instructions, when executed by the at least one processor, further cause the display apparatus to:

perform a process for determining the association information common to the plurality of areas based on the surrounding environmental light condition and a process for determining area association information indicating associations between a signal value of the input signals and the illumination ratio in each of the plurality of areas; and determine, based on the association information and the area association information, second association information indicating associations between the signal value of the input signals and the illumination ratio for each of the plurality of areas.

4. The display apparatus according to claim 1, wherein the one or more computer-executable instructions, when executed by the at least one processor, further cause the display apparatus to change a process for determining the surrounding environmental light condition based on at least one of a genre of the input image, a source of the input signals, or an image quality setting.

5. The display apparatus according to claim 1, wherein the one or more computer-executable instructions, when executed by the at least one processor, further cause the display apparatus to perform a correction process on the illumination ratio based on a setting value of a brightness determined through an operation of a user.

6. The display apparatus according to claim 5, wherein the one or more computer-executable instructions, when executed by the at least one processor, further cause the display apparatus to set the illumination ratio to a higher value for areas where the input signals have a signal value of less than the first signal threshold value in a case where the setting value of the brightness, which is used in the display apparatus, is less than or equal to a predetermined threshold value than in a case where the setting value of the brightness is greater than the predetermined threshold value.

7. The display apparatus according to claim 1, wherein the one or more computer-executable instructions, when executed by the at least one processor, further cause the display apparatus to perform a correction process on the illumination ratio, based on the surrounding environmental light condition.

8. The display apparatus according to claim 7, wherein the one or more computer-executable instructions, when executed by the at least one processor, further cause the display apparatus to set the illumination ratio to a higher value for areas where the input signals have a signal value of less than the first signal threshold value in a case where the correction process in the display apparatus, based on the surrounding environmental light condition, is active than in a case where the correction process is inactive.

9. The display apparatus according to claim 1, wherein the one or more computer-executable instructions, when executed by the at least one processor, further cause the display apparatus to:

acquire the brightness of the surroundings and information representing a color temperature of surrounding environmental light as the surrounding environmental light condition; and determine the illumination ratio of the backlight based on the brightness and the color temperature.

10. The display apparatus according to claim 1, wherein the one or more computer-executable instructions, when executed by the at least one processor, further cause the display apparatus to determine the illumination ratio of the backlight based on the input signals, the surrounding environmental light condition, and information representing a time of day in which the display apparatus is used.

11. The display apparatus according to claim 10, wherein the one or more computer-executable instructions, when executed by the at least one processor, further cause the display apparatus to set the illumination ratio of the backlight to a higher value for areas where the input signals have a signal value of less than the first signal threshold value in a case where the time of day in which the display apparatus is used corresponds to a wake-up time of a user than in a case where the time of day in which the display apparatus is used corresponds to a bedtime of the user.

12. The display apparatus according to claim 1, wherein the one or more computer-executable instructions, when executed by the at least one processor, further cause the display apparatus to:

perform a process for determining a signal value of the input signals for each of the plurality of areas based on a maximum value and an average value of the input signals in the area; and determine the illumination ratio of the backlight based on a relationship between a priority of the maximum value and a priority of the average value in the process for determining the signal value.

13. The display apparatus according to claim 1, wherein the one or more computer-executable instructions, when executed by the at least one processor, further cause the display apparatus to perform a correction process on the illumination ratio, correct the signal values of the input signals based on the illumination ratio prior to the correction process; and cause the display to display the input image based on the input signals having a signal value that is corrected and the illumination ratio subjected to the correction process.

14. A display control method comprising:

receiving input signals corresponding to an input image;

determining a surrounding environmental light condition including information representing a brightness of surroundings of a display apparatus;

determining, for each of a plurality of areas set on a display of the display apparatus, an illumination ratio of a backlight of the display based on the input signals and the surrounding environmental light condition;

causing the display to display the input image by illuminating the backlight of the display based on the illumination ratio, wherein the illumination ratio is determined, such that areas corresponding to a high tone range are assigned an illumination ratio of greater than or equal to an illumination ratio threshold value, the high tone range including input signals having a signal value of greater than or equal to a first signal threshold value; and set the illumination ratio to a higher value for areas corresponding to an intermediate tone range in a case where the surroundings of the display apparatus are determined to be bright based on the surrounding environmental light condition than in a case where the surroundings of the display apparatus are determined to be dark, the intermediate tone range including input signals having a signal value of greater than or equal to a second signal threshold value and less than the first signal threshold value.

15. A display apparatus comprising:

at least one processor;

at least one non-transitory computer-readable medium coupled to the at least one processor and storing one or more computer-executable instructions;

a display that displays an image; and a receiver that receives input signals corresponding to an input image, wherein the one or more computer-executable instructions, when executed by the at least one processor, cause the display apparatus to:

determine a surrounding environmental light condition including information representing a brightness of surroundings of the display apparatus;

determine, for each of a plurality of areas set on the display, an illumination ratio of a backlight of the display based on the input signals and the surrounding environmental light condition;

cause the display to display the input image by illuminating the backlight of the display based on the illumination ratio, wherein the illumination ratio is determined, such that areas corresponding to a high tone range are assigned an illumination ratio of greater than or equal to an illumination ratio threshold value, the high tone range including input signals having a signal value of greater than or equal to a first signal threshold value;

perform a correction process on the illumination ratio based on a setting value of a brightness determined through an operation of a user; and set the illumination ratio to a higher value for areas where the input signals have a signal value of less than the first signal threshold value in a case where the setting value of the brightness, which is used in the display apparatus, is less than or equal to a predetermined threshold value than in a case where the setting value of the brightness is greater than the predetermined threshold value.

* * * * *